United States Patent
Nishimoto et al.

(10) Patent No.: US 9,420,517 B2
(45) Date of Patent: Aug. 16, 2016

(54) APPARATUS AND METHOD FOR DETERMINING AN OPTIMUM GATEWAY NODE IN A COMMUNICATION NETWORK

(71) Applicant: FUJITSU LIMITED, Kawasaki-shi, Kanagawa (JP)

(72) Inventors: Norihito Nishimoto, Fukuoka (JP); Kensuke Kubo, Oonozyou (JP); Tatsuya Soneda, Fukuoka (JP); Yuichi Inao, Fukuoka (JP); Taiji Kondo, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 14/532,120

(22) Filed: Nov. 4, 2014

(65) Prior Publication Data
US 2015/0131480 A1    May 14, 2015

(30) Foreign Application Priority Data

Nov. 11, 2013   (JP) ................................. 2013-233342

(51) Int. Cl.
*H04W 40/12* (2009.01)
*H04W 40/24* (2009.01)
(52) U.S. Cl.
CPC ............ *H04W 40/12* (2013.01); *H04W 40/248* (2013.01)

(58) Field of Classification Search
CPC ..... H04W 40/12; H04W 88/02; H04W 56/00; H04L 41/0823
USPC .......................... 370/254, 252, 328; 455/436
See application file for complete search history.

(56) References Cited

U.S. PATENT DOCUMENTS

2008/0175257 A1* 7/2008 Winter ................ H04W 40/248
370/411

FOREIGN PATENT DOCUMENTS

JP    2009-81854    4/2009

* cited by examiner

*Primary Examiner* — Jamal Javaid
(74) *Attorney, Agent, or Firm* — Staas & Halsey LLP

(57) ABSTRACT

A network includes node devices each storing a table that manages paths to plural gateway devices for connecting to another network. A node device generates a hello frame for specifying a main gateway device of the node device at a predetermined timing, and transmits the hello frame to adjacent node devices. The node device, upon receiving a hello frame from an adjacent node device operating as a first hop destination of a data frame destined for the main gateway device, determines whether quality of a path to the main gateway device is lowest among paths to the plural gateway devices, based on path quality information included in the hello frame. When the quality of a path to the main gateway device is lowest, the node device changes the main gateway device to a gateway device that is registered in the table and specified by information included in the hello frame.

9 Claims, 22 Drawing Sheets

FIG. 3A

| GD | MAIN GW FLAG | LD1 | PATH USAGE AGING TIMER | EVALUATION VALUE | TTL |
|---|---|---|---|---|---|

FIG. 3B

| FIELD NAME | DEFINITION |
|---|---|
| GD | ADDRESS OF FINAL TARGET NODE DEVICE (GW ADDRESS) |
| MAIN GW FLAG | FLAG INDICATING MAIN GW OR NOT |
| LD1 | ADDRESS OF ADJACENT NODE DEVICE AS FIRST HOP DESTINATION |
| PATH USAGE AGING TIMER | TIMER MANAGING WHETHER OR NOT DATA FRAME DIRECTED TO GD HAS BEEN TRANSMITTED |
| EVALUATION VALUE | VALUE INDICATING QUALITY OF PATH TO GW |
| TTL | TIMER MANAGING VALIDITY OF ENTRY |

FIG. 4A

| LD | LS | GD | GS | FRAME TYPE |

FIG. 4B

| FIELD NAME | INFORMATION TO BE STORED |
|---|---|
| LD | ADDRESS OF ADJACENT NODE DEVICE AS TRANSMISSION DESTINATION |
| LS | ADDRESS OF ADJACENT NODE DEVICE AS TRANSMISSION SOURCE |
| GD | ADDRESS OF FINAL TARGET NODE DEVICE |
| GS | ADDRESS OF FRAME ISSUER NODE DEVICE |
| FRAME TYPE | INFORMATION INDICATING TYPE OF FRAME |

FIG. 12

GW ROUTING TABLE OF NODE DEVICE N1    ~T1

| GD | MAIN GW FLAG | LD1 | PATH USAGE AGING TIMER | EVALUATION VALUE |
|---|---|---|---|---|
| GW1 | 0 | N5 | 0 | 6 |
| GW2 | 0 | N5 | 0 | 8 |
| GW3 | 0 | N5 | 0 | 7 |
| GW4 | 1 | N5 | 20 | 9 |

GW ROUTING TABLE OF NODE DEVICE N2    ~T1

| GD | MAIN GW FLAG | LD1 | PATH USAGE AGING TIMER | EVALUATION VALUE |
|---|---|---|---|---|
| GW1 | 0 | N5 | 0 | 6 |
| GW2 | 0 | N5 | 0 | 8 |
| GW3 | 1 | N5 | 40 | 7 |
| GW4 | 0 | N5 | 0 | 9 |

GW ROUTING TABLE OF NODE DEVICE N3    ~T1

| GD | MAIN GW FLAG | LD1 | PATH USAGE AGING TIMER | EVALUATION VALUE |
|---|---|---|---|---|
| GW1 | 0 | N6 | 0 | 6 |
| GW2 | 1 | N6 | 30 | 8 |
| GW3 | 0 | N6 | 0 | 7 |
| GW4 | 0 | N6 | 0 | 9 |

GW ROUTING TABLE OF NODE DEVICE N4    ~T1

| GD | MAIN GW FLAG | LD1 | PATH USAGE AGING TIMER | EVALUATION VALUE |
|---|---|---|---|---|
| GW1 | 1 | N8 | 60 | 5 |
| GW2 | 0 | N8 | 0 | 7 |
| GW3 | 0 | N8 | 0 | 6 |
| GW4 | 0 | N8 | 0 | 8 |

GW ROUTING TABLE OF NODE DEVICE N5    ~T1

| GD | MAIN GW FLAG | LD1 | PATH USAGE AGING TIMER | EVALUATION VALUE |
|---|---|---|---|---|
| GW1 | 0 | N7 | 0 | 5 |
| GW2 | 0 | N7 | 0 | 7 |
| GW3 | 1 | N7 | 40 | 6 |
| GW4 | 0 | N7 | 20 | 8 |

FIG. 13

GW ROUTING TABLE OF NODE DEVICE N6     T1

| GD | MAIN GW FLAG | LD1 | PATH USAGE AGING TIMER | EVALUATION VALUE |
|---|---|---|---|---|
| GW1 | 0 | N8 | 40 | 5 |
| GW2 | 1 | N8 | 30 | 7 |
| GW3 | 0 | N8 | 0 | 6 |
| GW4 | 0 | N8 | 0 | 8 |

GW ROUTING TABLE OF NODE DEVICE N7     T1

| GD | MAIN GW FLAG | LD1 | PATH USAGE AGING TIMER | EVALUATION VALUE |
|---|---|---|---|---|
| GW1 | 0 | N9 | 0 | 4 |
| GW2 | 0 | N9 | 0 | 6 |
| GW3 | 0 | N9 | 40 | 5 |
| GW4 | 1 | N9 | 20 | 7 |

GW ROUTING TABLE OF NODE DEVICE N8     T1

| GD | MAIN GW FLAG | LD1 | PATH USAGE AGING TIMER | EVALUATION VALUE |
|---|---|---|---|---|
| GW1 | 0 | N9 | 60 | 4 |
| GW2 | 1 | N9 | 30 | 6 |
| GW3 | 0 | N9 | 0 | 5 |
| GW4 | 0 | N9 | 0 | 7 |

GW ROUTING TABLE OF NODE DEVICE N9     T1

| GD | MAIN GW FLAG | LD1 | PATH USAGE AGING TIMER | EVALUATION VALUE |
|---|---|---|---|---|
| GW1 | 1 | N11 | 60 | 3 |
| GW2 | 0 | N11 | 30 | 5 |
| GW3 | 0 | N11 | 40 | 4 |
| GW4 | 0 | N11 | 20 | 6 |

GW ROUTING TABLE OF NODE DEVICE N7        T1

| GD | MAIN GW FLAG | LD1 | PATH USAGE AGING TIMER | EVALUATION VALUE |
|---|---|---|---|---|
| GW1 | 1 | N9 | 0 | 4 |
| GW2 | 0 | N9 | 0 | 6 |
| GW3 | 0 | N9 | 40 | 5 |
| GW4 | 0 | N9 | 20 | 7 |

GW ROUTING TABLE OF NODE DEVICE N1 — T1

| GD | MAIN GW FLAG | LD1 | PATH USAGE AGING TIMER | EVALUATION VALUE |
|---|---|---|---|---|
| GW1 | 1 | N5 | 0 | 6 |
| GW2 | 0 | N5 | 0 | 8 |
| GW3 | 0 | N5 | 0 | 7 |
| GW4 | 0 | N5 | 20 | 9 |

FIG. 21

GW ROUTING TABLE OF NODE DEVICE N1 — T1

| GD | MAIN GW FLAG | LD1 | PATH USAGE AGING TIMER | EVALUATION VALUE |
|---|---|---|---|---|
| GW1 | 1 | N5 | 0 | 6 |
| GW2 | 0 | N5 | 0 | 8 |
| GW3 | 0 | N5 | 0 | 7 |
| GW4 | 0 | N5 | 20 | 9 |

GW ROUTING TABLE OF NODE DEVICE N2 — T1

| GD | MAIN GW FLAG | LD1 | PATH USAGE AGING TIMER | EVALUATION VALUE |
|---|---|---|---|---|
| GW1 | 0 | N5 | 0 | 6 |
| GW2 | 0 | N5 | 0 | 8 |
| GW3 | 1 | N5 | 40 | 7 |
| GW4 | 0 | N5 | 0 | 9 |

GW ROUTING TABLE OF NODE DEVICE N3 — T1

| GD | MAIN GW FLAG | LD1 | PATH USAGE AGING TIMER | EVALUATION VALUE |
|---|---|---|---|---|
| GW1 | 0 | N6 | 0 | 6 |
| GW2 | 1 | N6 | 30 | 8 |
| GW3 | 0 | N6 | 0 | 7 |
| GW4 | 0 | N6 | 0 | 9 |

GW ROUTING TABLE OF NODE DEVICE N4 — T1

| GD | MAIN GW FLAG | LD1 | PATH USAGE AGING TIMER | EVALUATION VALUE |
|---|---|---|---|---|
| GW1 | 1 | N8 | 60 | 5 |
| GW2 | 0 | N8 | 0 | 7 |
| GW3 | 0 | N8 | 0 | 6 |
| GW4 | 0 | N8 | 0 | 8 |

GW ROUTING TABLE OF NODE DEVICE N5 — T1

| GD | MAIN GW FLAG | LD1 | PATH USAGE AGING TIMER | EVALUATION VALUE |
|---|---|---|---|---|
| GW1 | 0 | N7 | 0 | 5 |
| GW2 | 0 | N7 | 0 | 7 |
| GW3 | 1 | N7 | 40 | 6 |
| GW4 | 0 | N7 | 20 | 8 |

FIG. 22

GW ROUTING TABLE OF NODE DEVICE N6     T1

| GD | MAIN GW FLAG | LD1 | PATH USAGE AGING TIMER | EVALUATION VALUE |
|---|---|---|---|---|
| GW1 | 0 | N8 | 40 | 5 |
| GW2 | 1 | N8 | 30 | 7 |
| GW3 | 0 | N8 | 0 | 6 |
| GW4 | 0 | N8 | 0 | 8 |

GW ROUTING TABLE OF NODE DEVICE N7     T1

| GD | MAIN GW FLAG | LD1 | PATH USAGE AGING TIMER | EVALUATION VALUE |
|---|---|---|---|---|
| GW1 | 1 | N9 | 0 | 4 |
| GW2 | 0 | N9 | 0 | 6 |
| GW3 | 0 | N9 | 40 | 5 |
| GW4 | 0 | N9 | 20 | 7 |

GW ROUTING TABLE OF NODE DEVICE N8     T1

| GD | MAIN GW FLAG | LD1 | PATH USAGE AGING TIMER | EVALUATION VALUE |
|---|---|---|---|---|
| GW1 | 0 | N9 | 60 | 4 |
| GW2 | 1 | N9 | 30 | 6 |
| GW3 | 0 | N9 | 0 | 5 |
| GW4 | 0 | N9 | 0 | 7 |

GW ROUTING TABLE OF NODE DEVICE N9     T1

| GD | MAIN GW FLAG | LD1 | PATH USAGE AGING TIMER | EVALUATION VALUE |
|---|---|---|---|---|
| GW1 | 1 | N11 | 60 | 3 |
| GW2 | 0 | N11 | 30 | 5 |
| GW3 | 0 | N11 | 40 | 4 |
| GW4 | 0 | N11 | 20 | 6 |

GW ROUTING TABLE OF NODE DEVICE N9　　　T1

| GD | MAIN GW FLAG | LD1 | PATH USAGE AGING TIMER | EVALUATION VALUE |
|---|---|---|---|---|
| GW1 | 1 | N11 | 60 | 3 |
| GW2 | 0 | N11 | 30 | 5 |
| GW3 | 0 | N11 | 40 | 4 |
| GW4 | 0 | N11 | 0 | 6 |

GW ROUTING TABLE OF NODE DEVICE N9    T1

| GD | MAIN GW FLAG | LD1 | PATH USAGE AGING TIMER | EVALUATION VALUE |
|---|---|---|---|---|
| GW1 | 1 | N11 | 60 | 3 |
| GW2 | 0 | N11 | 30 | 5 |
| GW3 | 0 | N11 | 40 | 4 |
| GW5 | 0 | GW5 | 100 | 2 |

APPARATUS AND METHOD FOR DETERMINING AN OPTIMUM GATEWAY NODE IN A COMMUNICATION NETWORK

CROSS-REFERENCE TO RELATED APPLICATION

This application is based upon and claims the benefit of priority of the prior Japanese Patent Application No. 2013-233342, filed on Nov. 11, 2013, the entire contents of which are incorporated herein by reference.

FIELD

The embodiments discussed herein are related to apparatus and method for determining an optimum gateway node in a communication network.

BACKGROUND

In recent years, studies on an ad hoc network in which a plurality of communication devices (hereinafter, referred to as node devices) are connected to each other in an autonomously distributed manner have been advanced. The respective node devices in the ad hoc network autonomously build a network in accordance with a communication environment.

For example, when a node device in the ad hoc network communicates with a node device in a network different from the ad hoc network, communication has to be established via a gateway device capable of connecting both the networks.

In such a case, each node device in the ad hoc network transmits a data frame to a target gateway device by causing an adjacent node device to relay the data frame received from another adjacent node device (hereinafter, referred to as an adjacent node device) based on a network topology (routing table). At this time, each node device selects a path with higher transmission quality and transmits the data frame (see Japanese Laid-open Patent Publication No. 2009-081854, for example).

The routing table is built by exchanging hello frames and is updated such that an optimal path may be selected. Each entry in the routing table includes a value indicating frequency in use, and the value indicating the frequency in use is reset when the path indicated by the entry is used. In addition, the value indicating the frequency in use is "0" when the path indicated by the entry is not used for a predetermined period of time, which is a state indicating that the path is not used.

In order to suppress consumption of memory, the number of entries in the routing table is typically limited. When the number of entries of gateway devices has reached the upper limit thereof, the entry whose value indicating the frequency in use is "0" is to be replaced in the related art.

That is, it is not possible to register a gateway device with higher path quality in the routing table in a case where there is no entry whose value indicating the frequency in use is "0" in a state where the number of entries of the gateway devices has reached the upper limit thereof even if a gateway device with higher path quality is added to the network.

In particular, since the value indicating frequency in use included in an entry is often reset in a node device which is used as a path to a plurality of gateway devices, it is difficult to replace entries in the routing table. For this reason, it is not possible to build an optimal path.

SUMMARY

According to an aspect of the invention, a node device included in a communication network is provided with a table that manages paths to a plurality of gateway devices for connecting to another communication network, the table including a first number of entries storing first path information, path quality information, and specification information in association with each of the plurality of gateway devices. The first path information identifies a local-destination node device, among a plurality of adjacent node devices each having a link to the node device, that operates as a first hop destination of a data frame destined for the each gateway device when the data frame is transmitted from the node device. The path quality information indicates quality of a path to the each gateway device. The specification information specifies a first main gateway device operating as a gateway device that is used by the node device when the node device communicates with another node device configuring another communication network. The node device generates a first hello frame for specifying the first main gateway device of the node device at a first predetermined timing with reference to the table, where the first hello frame includes gateway device information and device identification information identifying the node device. The gateway device information includes the first number of pairs of gateway device identification information identifying each of the plurality of gateway devices registered in the table and the path quality information associated with the each gateway device. The node device transmits the generated first hello frame to the plurality of adjacent node devices. The node device receives a second hello frame from one of the plurality of adjacent node devices, and determines whether or not a transmission source node device of the second hello frame is the local-destination node device for the first main gateway device of the node device, with reference to the table, based on the device identification information included in the second hello frame. When it is determined that the transmission source node device of the second hello frame is the local-destination node device, the node device determines whether or not quality of a path to the first main gateway device is lowest among paths to the plurality of gateway devices excluding a path to a second main gateway device operating as a main gateway of the transmission source node device of the second hello frame, based on the path quality information included in the second hello frame. When it is determined that the quality of a path to the first main gateway device is lowest, the node device changes the specification information so that one of other gateway devices that are registered in the table and specified by the gateway device identification information included in the second hello frame is set as the first main gateway device of the node device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram illustrating an example of a gateway (GW) routing table, according to an embodiment;

FIG. 3B is a diagram illustrating an example of fields in a GW routing table, according to an embodiment;

FIG. 4A is a diagram illustrating an example of a format of a header in a data frame, according to an embodiment;

FIG. 4B is a diagram illustrating an example of fields in a header of a data frame, according to an embodiment;

FIGS. 12 and 13 are diagrams illustrating an example of GW routing tables provided in node devices in a network, according to an embodiment;

FIGS. 21 and 22 are diagrams illustrating an example of GW routing tables provided in node devices in a network, according to an embodiment;

DESCRIPTION OF EMBODIMENTS

Hereinafter, a detailed description will be given of an embodiment with reference to the drawings.

Figure 1:
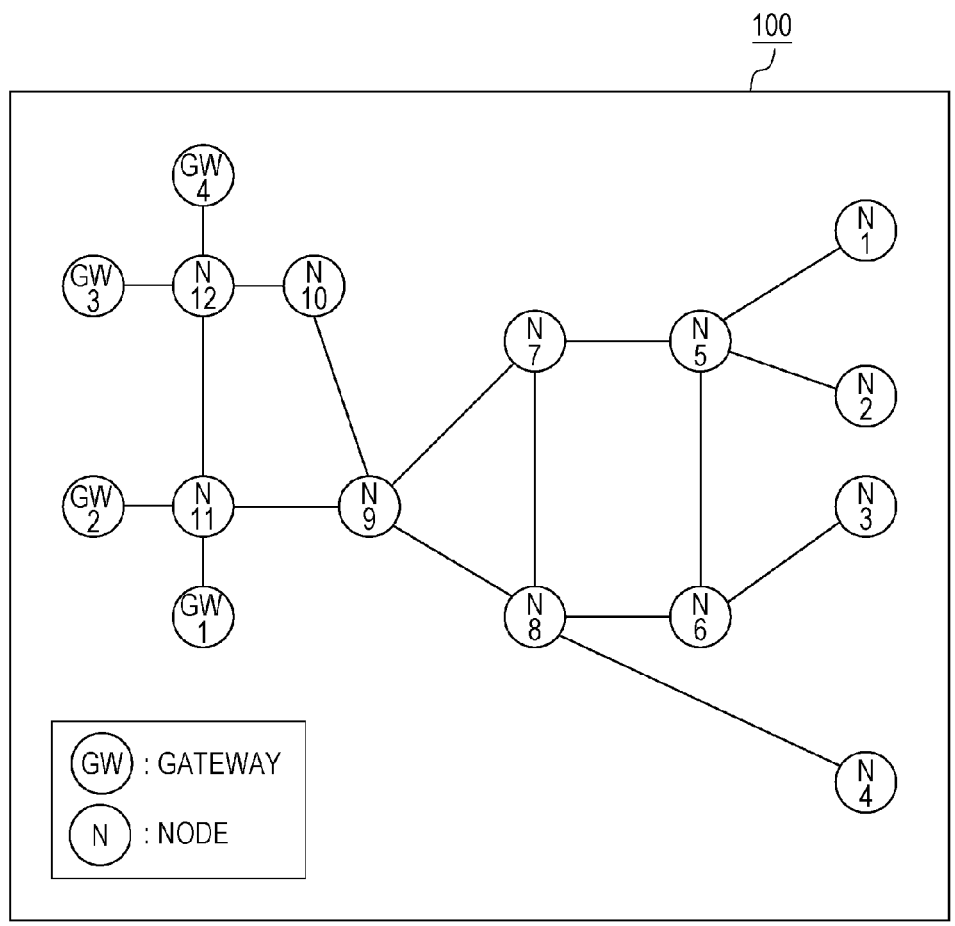
FIG. 1 is a diagram illustrating a configuration example of a network, according to an embodiment.

First, a description will be given of an ad hoc network according to the embodiment with reference to FIG. 1. FIG. 1 is a diagram illustrating a configuration example of a network, according to an embodiment.

The network 100 is an example of the ad hoc network and includes a plurality of gateway devices (hereinafter, referred to as GWs) which are connected to a network different from the network 100 and a plurality of node devices 1. There is a link between the devices which configure the network 100, and the link is depicted by a solid line in FIG. 1.

The node devices 1 are illustrated with reference numerals "Ni" (i=1, . . . , 12) in FIG. 1. Each "Ni" is a device identification (ID) with which it is possible to uniquely identify a node device 1. Similarly, the GWs are illustrated with reference numerals "GWj" (j=1, . . . , 4) in FIG. 1, and each GWj" is a device ID with which it is possible to uniquely identify a GW. Hereinafter, a specific node device 1 is referred to as a node device N1, for example. The node device N1 represents a node device 1 whose device ID is N1.

The link may be a wireless link or a wired link. Referring to FIG. 1, for example, a case where the node device N1 and the node device N5 may directly communicate with each other without being relayed by another node device 1 will be referred to as a case were "there is a link between the node device N1 and the node device N5".

The link dynamically changes, and there is a case where a link is newly established between node devices 1 or a case where a link which has been established until now disappears due to an influence of weather, a blocking object, or the like. If node devices 1 are mobile node devices, for example, there is a case where presence of the link changes due to variations in distance between the node devices 1. In addition, there is also a case where a link is newly established or a link which has been established until now disappears due to a change in cable connection, for example, and there is also a case where the link disappears due to a failure such as cable disconnection.

Figure 2:
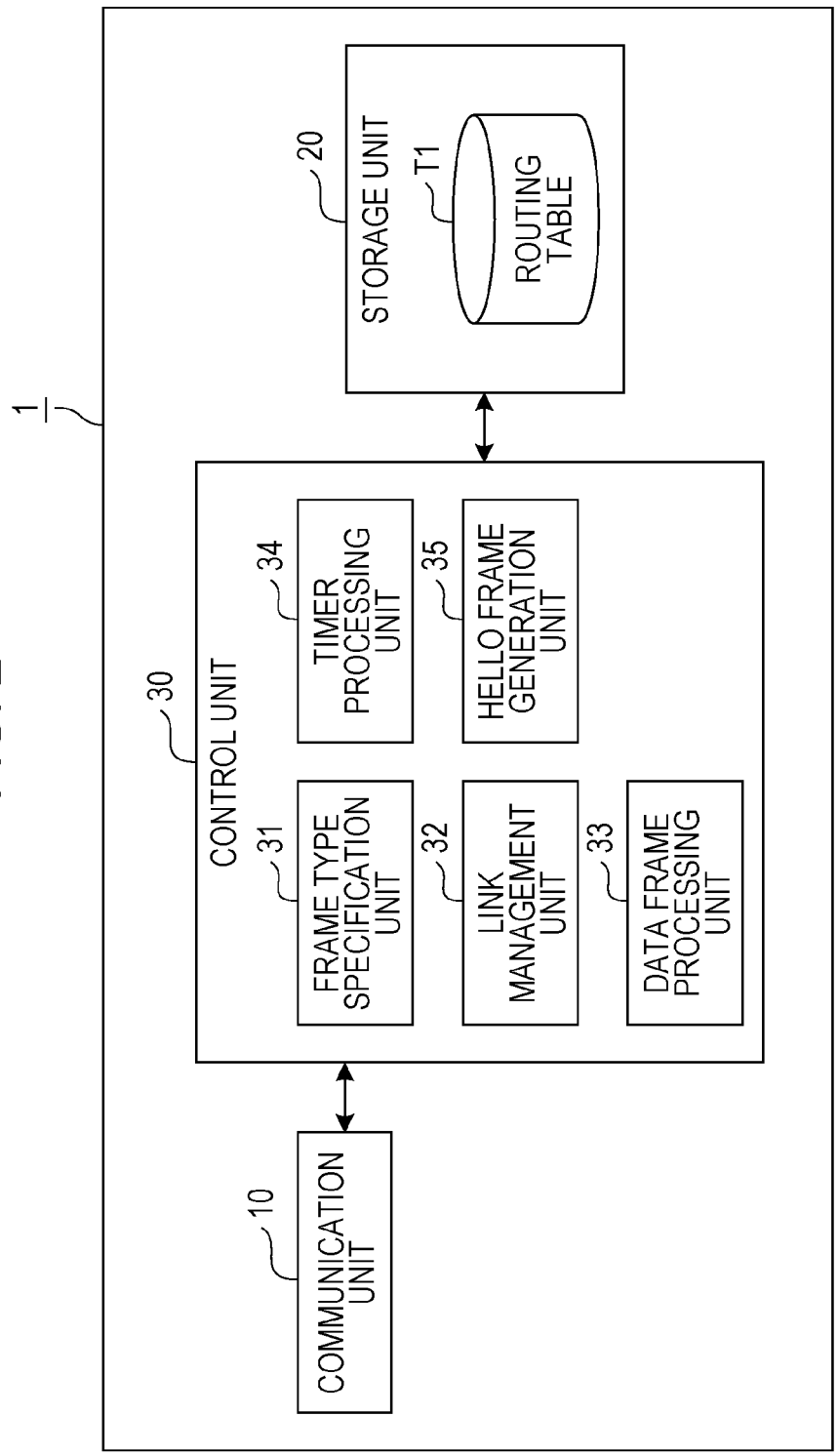
FIG. 2 is a diagram illustrating an example of a functional configuration of a node device, according to an embodiment.

FIG. 2 is a diagram illustrating an example of a functional configuration of a node device, according to an embodiment. FIG. 2 shows a node device 1 which configures the network 100.

The node device 1 includes a communication unit 10, a storage unit 20, and a control unit 30 as illustrated in FIG. 2.

The communication unit 10 includes a communication module or the like and communicates with another node device 1. For example, the communication unit 10 transmits and receives a frame such as a data frame.

The storage unit 20 is configured to include a random access memory (RAM), a read only memory (ROM), a flash memory, and the like. The storage unit 20 functions as a work area for a micro-processing unit (MPU) included in the control unit 30, a program area for storing various programs such as an operation program for controlling the node device 1 as a whole, and a data area for storing various kinds of data such as a routing table T1 for the GW as will be described later in detail. In addition, an address of the node device 1 is also stored on the data area. Hereinafter, "a routing table T1 for the GW" will be also expressed as "GW routing table T1".

Here, a description will be given of the GW routing table T1 stored in the data area in the storage unit 20 with reference to FIGS. 3A and 3B. FIG. 3A is a diagram illustrating an example of a routing table, according to an embodiment, where the GW routing table T1 is illustrated as an example. FIG. 3B is a diagram describing fields in a GW routing table, according to an embodiment, where the fields in the GW routing table T1 exemplified in FIG. 3A are described.

The GW routing table T1 is managed by a link management unit 32 (which will be described later in detail) or the like, and is a table which manages information desired for specifying an adjacent node device 1 to which a data frame is sent when the data frame is transmitted to the GW. The GW routing table T1 according to the embodiment is a table in which a main GW flag, a local destination (LD) 1, a path usage aging timer, an evaluation value, and a time-to-live (TTL) are associated with each other for each global destination (GD) as illustrated in FIG. 3A, and the number of entries storable in the table is limited.

GD is an address of a target GW (an internet protocol (IP) address, for example) to which the data frame is to be finally transmitted, in the GW routing table T1.

The main GW flag is a flag which indicates a main GW of the node device 1. In the embodiment, a flag value "1" indicates that the target GW is a main GW, and a flag value "0" indicates that the target GW is not a main GW.

Here, the main GW is a GW which is used for communication with a node device in a network different from the network 100, and typically a GW which is initially registered in the GW routing table T1 in an initial state, namely a GW which is registered first in the GW routing table T1 among GWs on which information is included in a hello frame that has been first received. The main GW is changed to a GW with higher path quality, that is, the main GW is changed based on an evaluation value. According to the embodiment, a hysteresis is provided in order to suppress frequent change in the main GW, and the main GW is not changed as long as a difference from the evaluation value of the main GW is not equal to or greater than a predetermined value.

An LD1 is an address of an adjacent node device 1, among adjacent node devices 1 having links connected to the device 1, to which a data frame is transferred first when the data frame is transmitted to a GD, that is, an address of an adjacent node device 1 of a first path.

The path usage aging timer is a timer which manages whether or not a data frame has been transmitted to the GD (GW), and is controlled by a data frame processing unit 33 (which will be described later in detail) and a timer processing unit 34 (which will be described later in detail). For example, when the node device 1 transmits a data frame to a corresponding GD (GW), the path usage aging timer is reset by the data frame processing unit 33. That is, a value of the path usage aging timer stays around an initial value when transmission frequency is high. In addition, the path usage aging timer is decremented by the timer processing unit 34 every time a predetermined amount of time has elapsed. Moreover, the initial value of the path usage aging timer according to the embodiment is "100".

The evaluation value represents quality of a path to a corresponding GD (GW). In the embodiment, it is assumed that the smaller is the evaluation value of a path, the better is the quality of the path.

The TTL is a timer for managing validity of an entry and is controlled by the link management unit 32 and the timer processing unit 34. When a hello frame which is transmitted from a corresponding LD1 and includes the GW address corresponding to an entry is received by the node device 1, for example, the TTL of the entry is reset by the link management unit 32. In addition, the TTL is decremented by the timer processing unit 34 every time a predetermined amount of time has elapsed. In the embodiment, it is assumed that the initial value of the TTL is "100". Moreover, a case where a TTL value of an entry is "0" represents a case where the entry is invalid.

Next, a description will be given of a header in a data frame which is generated by the data frame processing unit 33 with reference to FIGS. 4A and 4B. FIG. 4A is a diagram illustrating an example of a format of a header in a data frame, according to an embodiment, and FIG. 4B is a diagram describing fields in a header, according to an embodiment, where the fields of the format illustrated in FIG. 4A are described.

The header in the data frame according to the embodiment includes an LD, a local source (LS), a GD, a global source (GS), and a frame type as illustrated in FIG. 4A.

The LD is an address of an adjacent node device 1 as a transmission destination node device, and the data frame processing unit 33 in the node device 1 which functions as the LS refers to a routing table such as a GW routing table T1 and specifies an LD corresponding to the GD. Referring to FIG. 1, for example, an address of the node device N5 is stored in an "LD" field in a data frame to be transmitted from the node device N1 to the node device N5.

The "LS" field stores an address of a node device 1 that serves as a transmission source node device in transmission of a data frame between adjacent node devices, and the data frame processing unit 33 in the node device 1 which functions as a LS stores the address of the node device 1 in the "LS" field. Referring to FIG. 1, for example, the address of the node device N1 is stored in an "LS" field in the data frame to be transmitted from the node device N1 to the node device N5.

The "GD" field stores an address of a node device 1 as a final destination. The "GS" field stores an address of a node device (hereinafter, also referred to as an issuer node device) 1 as an issuer of the data frame. Referring to FIG. 1, for example, when the data frame issued by the node device N1 is relayed by the node device N5, the node device N7, the node device N9, the node device N11, and the node device N12 in this order and is finally transmitted to GW4, the address of GW4 is stored in the "GD" field in the data frame, and the address of the node device N1 is stored in the "GS" field.

The frame type is information indicating a type of a frame, and in the case of a data frame, information indicating that a type of a frame is a data frame is stored in the "frame type" field. As types of frames, there are at least two types, namely a data frame and a hello frame in the embodiment.

The data frame is a frame which includes, as payload, information to be delivered from the issuer node device 1 (GS) to the final destination node device 1 (GD).

A hello frame is a frame which is generated by a hello frame generation unit 35 (which will be described later in detail) for providing information about the presence of the node device 1 to another node device 1 and includes information needed for path creation.

Figure 5:
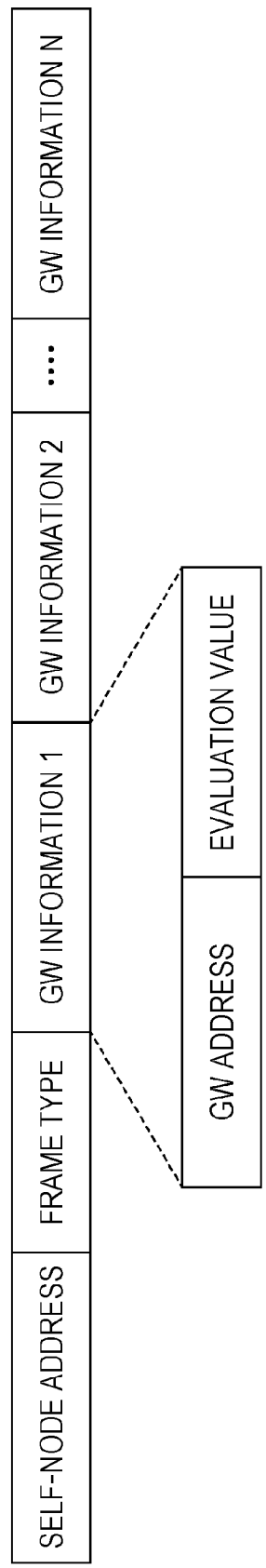
FIG. 5 is a diagram illustrating an example of a format of a hello frame, according to an embodiment.

FIG. 5 is a diagram illustrating an example of a format of a hello frame, according to an embodiment. The hello frame according to the embodiment includes a self-node address (an address of the node device 1 as a hello frame generation source), a frame type, and GW information as illustrated in FIG. 5.

The GW information includes at least GW addresses which are addresses of GWs registered in the GW routing table T1 provided in the node device 1 and evaluation values of the GWs as illustrated in FIG. 5. When N (N≤4 in the embodiment) GWs are registered in the GW routing table T1, for example, N GW information items are stored in the hello frame. At this time, an identifier with which it is possible to specify a main GW of the node device 1 as a transmission source node device of a hello frame is added thereto. In the embodiment, the GW information item including an address of the main GW is arranged at the head of a list of the GW information items so that the main GW is identified from the hallo frame.

Referring to FIG. 2 again, the control unit 30 includes an MPU, for example, executes an operation program stored in the program area of the storage unit 20, implements functions as the frame type specification unit 31, the link management unit 32, the data frame processing unit 33, the timer processing unit 34, and the hello frame generation unit 35 as illustrated in FIG. 2, and executes processing such as control processing for controlling the entire node device 1 and frame type specification processing as will be described later in detail.

The frame type specification unit 31 specifies a type of a frame received by the communication unit 10. For example, when a frame is received, the communication unit 10 outputs the received frame to the frame type specification unit 31. Then, the frame type specification unit 31 analyzes a header in the received frame and specifies the type of the frame based on frame types.

Then, when the specified type of the frame is a hello frame, the frame type specification unit 31 outputs the received frame to the link management unit 32. When the specified type of the frame is a data frame, the frame type specification unit 31 outputs the received frame to the data frame processing unit 33.

The link management unit 32 manages the GW routing table T1. More specifically, in a case where the received frame is a hello frame, the link management unit 32 analyzes a received hello frame, and updates the GW routing table T1 based on the results of analysis.

When GW information is included in the received hello frame, the link management unit 32 acquires an entry of the GW routing table T1. In addition, when a GW (hereinafter, referred to as a processing target GW) corresponding to the GW address included in the processing target GW information has been registered in the acquired entry and an address (hereinafter, referred to as a transmission source address) of an adjacent node device 1 as a transmission source node device of the received hello frame is LD1 of the processing target GW, the link management unit 32 updates the entry of the processing target GW. More specifically, the link management unit 32 resets the TTL corresponding to the processing target GW and updates a corresponding evaluation value based on a method in the related art.

When the processing target GW has not been registered in any existing entry and there is vacancy in the GW routing table T1, the link management unit 32 newly registers the processing target GW. More specifically, the link management unit 32 adds a new entry, stores the address of the processing target GW in the "GD" field of the new entry, stores the transmission source address of the received hello frame in the "LD1" field of the new entry, and sets a flag value of the "main GW flag" of the new entry at "0". In a case of the first registration of an entry in the GW routing table T1, the flag value of the "main GW flag" is set at "1" in the entry. In addition, in the entry, the link management unit 32 sets initial values for the path usage aging timer and the TTL corresponding to the processing target GW and sets a corresponding evaluation value based on a method in the related art.

When the processing target GW has not been registered, there is no vacancy for the entry in the GW routing table T1, there is an entry whose path usage aging timer has been set at "0", and the evaluation value of the processing target GW is smaller than the evaluation value of the entry whose path usage aging timer has been set at "0", that is, when the processing target GW is an unregistered GW with higher path quality, the link management unit 32 performs replacement registration of the processing target GW. When a plurality of entries may be replaced at this time, replacement is performed in order from an entry with a larger evaluation value, for example.

More specifically, the link management unit 32 deletes an entry whose path usage aging timer has been set at "0", and adds a new entry by storing the address of the processing target GW in the "GD" field thereof, storing the transmission source address of the received hello frame in the "LD1" field thereof, and setting the flag value of the "main GW flag" thereof at "0". In addition, the link management unit 32 sets initial values for the path usage aging timer and the TTL corresponding to the processing target GW and sets a corresponding evaluation value based on a method in the related art.

When the transmission source address of the received hello frame is LD1 of the main GW of the node device 1 and the evaluation value of the main GW of the node device 1 is the largest among the GWs specified by the GW addresses included in the hello frame except for the main GW of the adjacent node device 1 as the hello frame transmission source node device, the link management unit 32 changes the main GW of the node device 1.

More specifically, the link management unit 32 sets, as a main GW, one of the GWs with addresses included in the received hello frames among the GWs registered in the GW routing table T1 except for the main GW (the flag value of the main GW flag thereof is changed to "1"). At this time, when there is no GW with the address included in the received hello frame among the GWs registered in the GW routing table T1 except for the main GW, the link management unit 32 does not change the main GW.

According to the embodiment, when there are a plurality of GWs with the addresses included in the received hello frame among the GWs registered in the GW routing table T1 except for the main GW, the link management unit 32 sets, as a main GW, the GW with the smallest evaluation value, namely the GW with the highest path quality.

When TTL information (which will be described later in detail) transmitted from the timer processing unit 34 is received, the link management unit 32 deletes an entry in the GW routing table T1 based on the TTL information.

The data frame processing unit 33 performs processing on the received data frame. More specifically, when the data frame is received, the data frame processing unit 33 analyzes a header of the received data frame and determines whether or not the GD coincides with the address of the node device 1. That is, the data frame processing unit 33 determines whether or not a final destination of the received data frame is the node device 1.

When the final destination of the received data frame is the node device 1, the data frame processing unit 33 outputs the received data frame to an upper-order layer. In response to the input of the data frame, the upper-order layer performs processing on the received data frame.

In contrast, when the final destination of the received data frame is another node device 1, the data frame processing unit 33 performs data frame transfer processing. More specifically, the data frame processing unit 33 resets the path usage aging timer corresponding to the GD (GW) of the received data frame. Then, the data frame processing unit 33 searches the GW routing table T1 by using the GD (GW) of the received data frame as a key and specifies the LD1 corresponding to the GD (GW) of the received data frame.

Then, the data frame processing unit 33 sets a header of the data frame to be transferred. More specifically, the data frame processing unit 33 sets the address of the node device 1 in the LS of the header and sets the specified LD1 in the LD of the header. Then, the data frame processing unit 33 transmits the data frame to be transferred, to the adjacent node device 1 indicated by the specified LD1 via the communication unit 10.

Furthermore, the data frame processing unit 33 generates a data frame with the header exemplified in FIG. 3A in response to a request from the upper-order layer and transmits the generated data frame to another node device 1 via the communication unit 10.

The timer processing unit 34 executes predetermined processing every time a predetermined amount of time has elapsed. For example, the timer processing unit 34 transmits an instruction for generating a hello frame to the hello frame generation unit 35 every time a predetermined amount of time t1 has elapsed.

In addition, the timer processing unit 34 executes aging processing of the path usage aging timer and the TTL in the GW routing table T1 every time a predetermined amount of time t2 has elapsed. More specifically, when the path usage aging time is equal to or greater than "1", the timer processing unit 34 decrements the path usage aging timer and decrements the TTL. In contrast, when the path usage aging timer is "0", the timer processing unit 34 decrements only the TTL. In addition, a configuration is also applicable in which the aging timings of the path usage aging timer and the TTL differ from each other.

Then, when the TTL value after the decrementing is "0", that is, when the corresponding entry is invalidated, the timer processing unit 34 transmits TTL information which indicates that the TTL value is "0" to the link management unit 32. The TTL information includes GD corresponding to the TTL, the value of which is "0", and the link management unit 32 which receives the TTL information deletes an entry corresponding to the GD included in the TTL information from the GW routing table T1.

Upon receiving the instruction for generating a hello frame transmitted by the timer processing unit 34, the hello frame generation unit 35 generates the hello frame exemplified in FIG. 5 and transmits the generated hello frame to the adjacent node device 1 via the communication unit 10.

More specifically, the hello frame generation unit 35, with reference to the GW routing table T1, generates a hello frame which does not include GW information when there is no entry in the GW routing table T1, that is, when no GW has been registered in the GW routing table T1, and generates a hello frame which includes GW information for all the entries included in the GW routing table T1 when there exist entries in the GW routing table T1.

For example, it is assumed that GW1 to GW4 are registered in the GW routing table T1, that the GW1 is a main GW of the node device 1, and that evaluation values thereof are H1 to H4, respectively, where H1<H3<H2<H4. In such a case, the hello frame generation unit 35 places a piece of GW information that includes an address of the GW1 as the main GW and the evaluation value H1 of the GW1, at a head, and arranges pieces of GW information that include addresses and evaluation values of the GW2 to the GW4, in ascending order of evaluation values (that is, in the order in which the path quality is higher).

In this example, the hello frame generation unit 35 generates a hello frame in which GW information including the address of the GW1 and the evaluation value H1 of the GW1, GW information including the address of the GW3 and the evaluation value H3 of the GW3, GW information including the address of the GW2 and the evaluation value H2 of the GW2, and GW information including the address of the GW4 and the evaluation value H4 of the GW4 are arranged in this order. Hereinafter, the hello frame in which the GW information is arranged in such an order will be referred to as a hello frame {GW1, GW3, GW2, GW4}.

Figure 6:
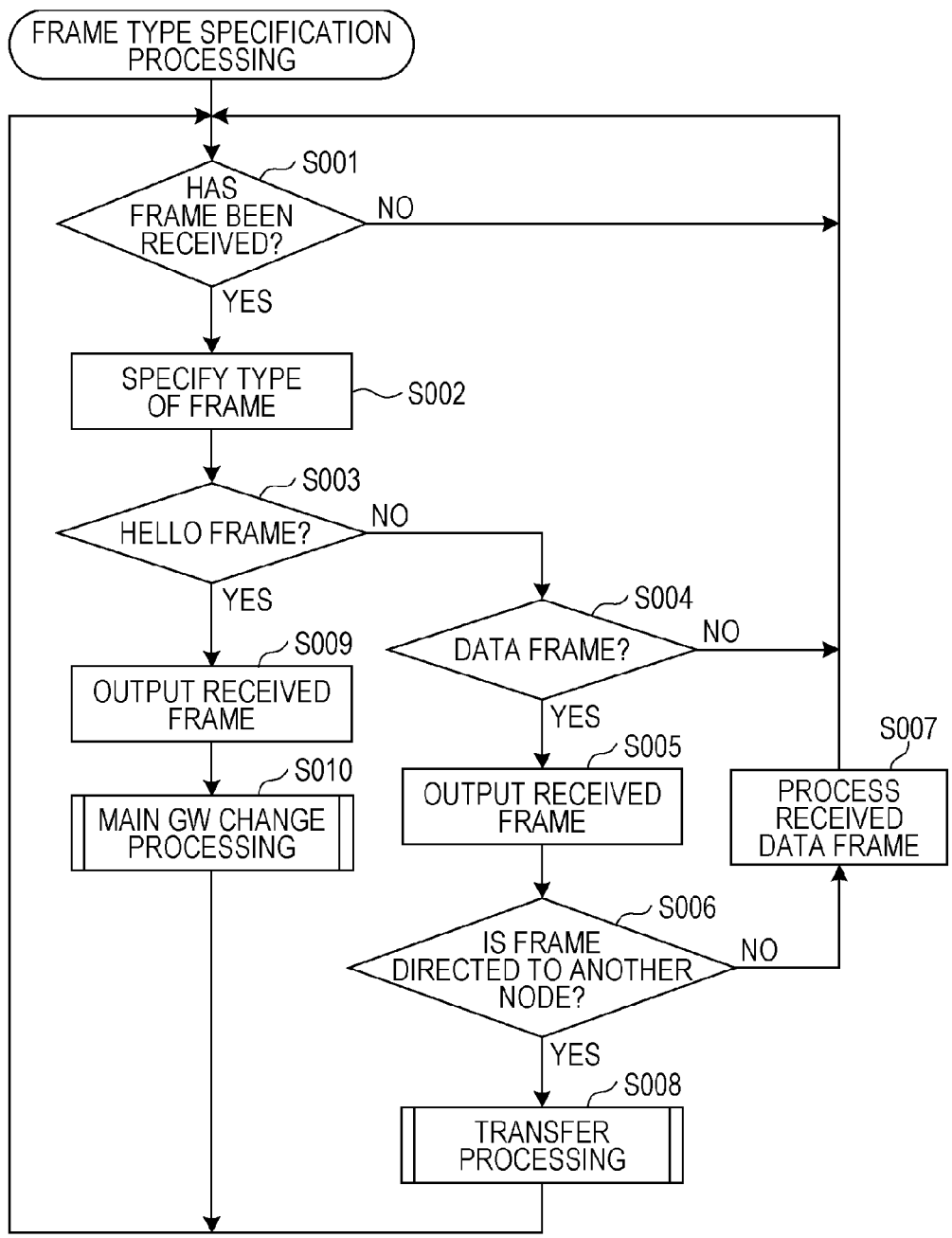
FIG. 6 is a diagram illustrating an example of an operational flowchart for frame type specification processing, according to an embodiment.

Next, a description will be given of a flow of frame type specification processing according to the embodiment with reference to FIG. 6. FIG. 6 is a diagram illustrating an example of an operational flowchart for frame type specification processing, according to an embodiment. The frame type specification processing is invoked upon reception of a frame.

The frame type specification unit 31 determines whether or not a frame has been received (Step S001). When it is determined by the frame type specification unit 31 that no frame has been received (Step S001; NO), the processing in Step S001 is repeated, and reception of a frame is waited for.

In contrast, when it is determined that a frame has been received (Step S001; YES), the frame type specification unit 31 specifies a type of the received frame (Step S002) and determines whether or not the specified type is a hello frame (Step S003).

When it is determined that the specified type is not a hello frame (Step S003; NO), the frame type specification unit 31 further determines whether or not the specified type is a data frame (Step S004).

When it is determined by the frame type specification unit 31 that the specified type is not a data frame (Step S004; NO), the processing returns to Step S001, and the aforementioned processing is repeated. In contrast, when it is determined that the specified type is a data frame (Step S004; YES), the frame type specification unit 31 outputs the received frame to the data frame processing unit 33 (Step S005).

Then, the data frame processing unit 33 determines whether or not the received data frame is directed to another node device 1 (Step S006). When it is determined that the received data frame is directed to the node device 1 (Step S006; NO), the data frame processing unit 33 outputs the received data frame to the upper-order layer, and the upper-order layer performs processing on the received data frame in response to the input of the data frame (Step S007). Then, the processing returns to Step S001, and the aforementioned processing is repeated.

Meanwhile, when it is determined that the received data frame is directed to another node device 1 (Step S006; YES), the data frame processing unit 33 performs the transfer processing of the received data frame (Step S008). Then, the processing returns to Step S001, and the aforementioned processing is repeated.

Here, when it is determined in the processing in Step S003 that the specified type is a hello frame (Step S003; YES), the frame type specification unit 31 outputs the received frame to the link management unit 32 (Step S009).

Then, the link management unit 32 performs main GW change processing (Step S010), the processing returns to Step S001, and the aforementioned processing is repeated.

Figure 7:
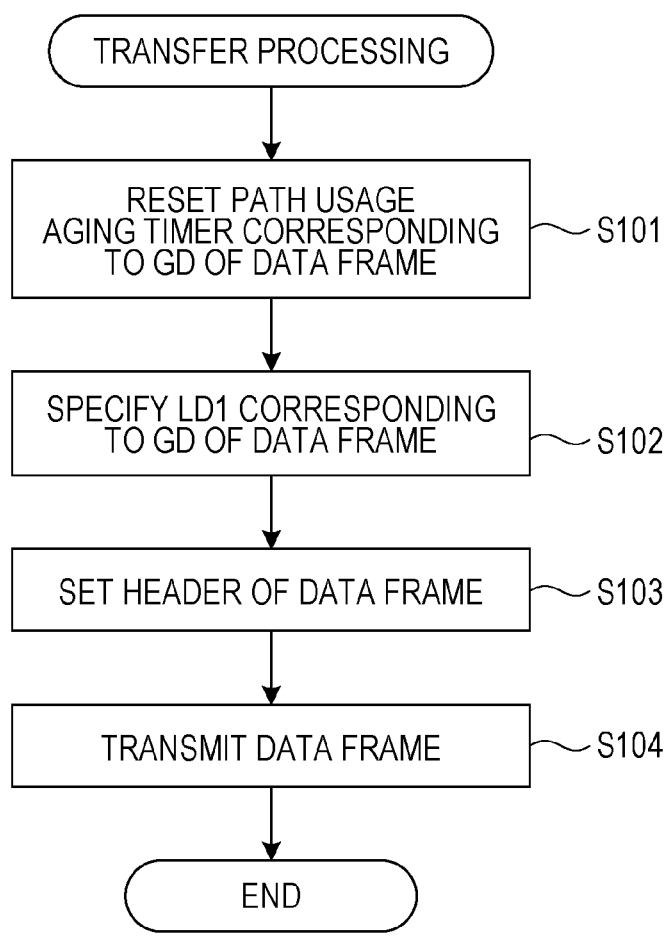
FIG. 7 is a diagram illustrating an example of an operational flowchart for transfer processing, according to an embodiment.

Next, a description will be given of a flow of the transfer processing according to the embodiment with reference to FIG. 7. FIG. 7 is a diagram illustrating an example of an operational flowchart for transfer processing, according to an embodiment. The transfer processing corresponds to the processing in Step S008 in the aforementioned frame type specification processing.

The data frame processing unit 33 resets the path usage aging timer corresponding to the GD in the received data frame (Step S101) and specifies the LD1 corresponding to the GD in the received data frame with reference to the GW routing table T1 (Step S102).

Then, the data frame processing unit 33 sets a header of the data frame to be transferred (Step S103) and transmits the data frame to be transferred to the adjacent node device 1 indicated by the specified LD1 via the communication unit 10 (Step S104). Then, the processing is completed.

Figure 8:
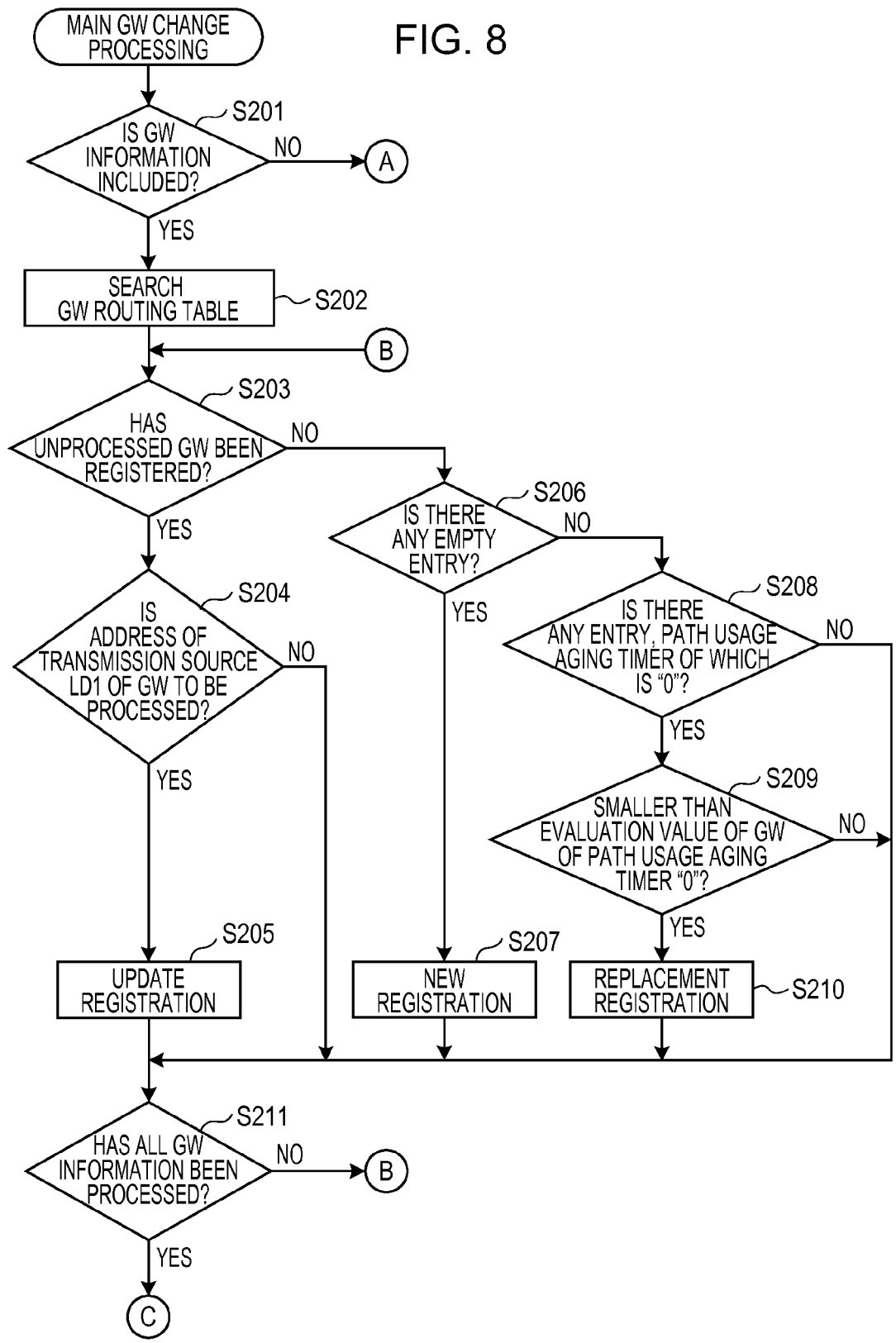
FIGS. 8 and 9 are diagrams illustrating an example of an operational flowchart for main GW change processing, according to an embodiment.
Figure 9:
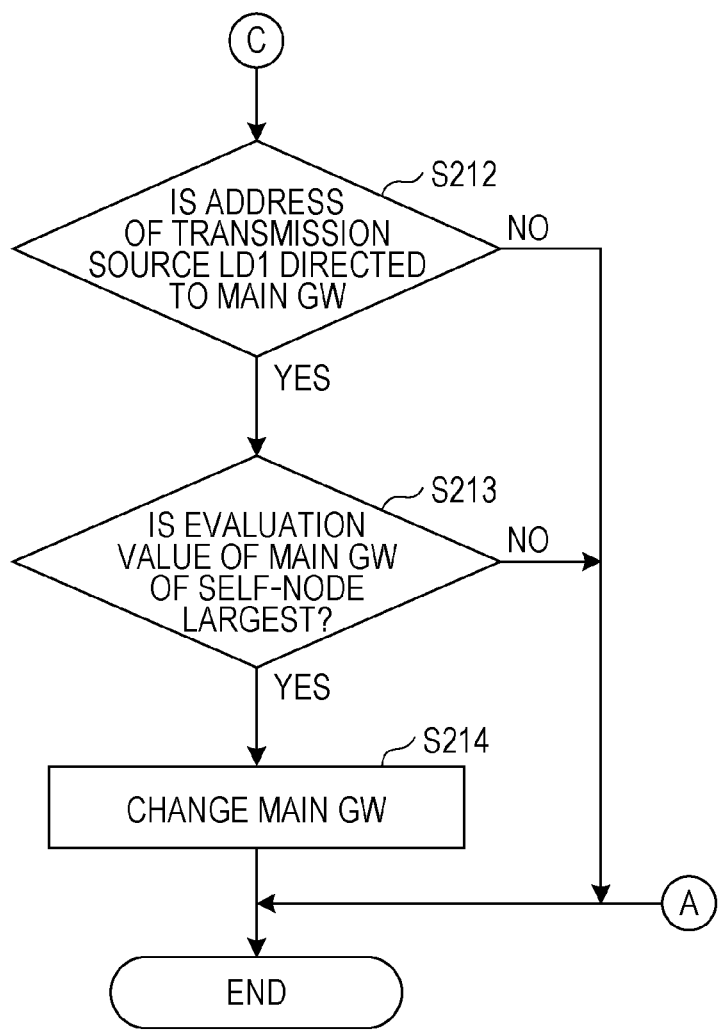

Next, a description will be given of a flow of the main GW change processing according to the embodiment with reference to FIGS. 8 and 9. FIGS. 8 and 9 are diagrams illustrating an example of an operational flowchart for main GW change processing, according to an embodiment. The main GW change processing corresponds to the processing in Step S010 in the aforementioned frame type specification processing.

The link management unit 32 analyzes the received hello frame and determines whether or not GW information is included therein (Step S201). When it is determined by the link management unit 32 that no GW information is included (Step S201; NO), the processing is completed.

In contrast, when it is determined that GW information is included (Step S201; YES), the link management unit 32 searches the GW routing table T1 (Step S202) and determines whether or not the GW to be processed has been registered therein (Step S203).

When it is determined that the GW to be processed has been registered (Step S203; YES), the link management unit 32 further determines whether or not a transmission source address of the received hello frame is the LD1 of the GW to be processed (Step S204).

When it is determined by the link management unit 32 that the transmission source address is different from the LD1 of the GW to be processed (Step S204; NO), the processing proceeds to Step S211 which will be described later. In contrast, when it is determined that the transmission source address coincides with the LD1 of the GW to be processed (Step S204; YES), the link management unit 32 updates registration of the entry of the GW to be processed (Step S205), and the processing proceeds to Step S211 which will be described later.

When it is determined in the processing in Step S203 that the GW to be processed has not been registered (Step S203; NO), the link management unit 32 further determines whether or not there is a vacant entry in the GW routing table T1 (Step S206).

When it is determined that there is a vacant entry (Step S206; YES), the link management unit 32 newly registers the GW to be processed (Step S207), and the processing proceeds to Step S211 which will be described later.

In contrast, when it is determined that there is no vacant entry (Step S206; NO), the link management unit 32 further determines whether or not there is an entry whose path usage aging timer is set at "0" (Step S208). When it is determined by the link management unit 32 that there is no entry whose path usage aging timer is set at "0" (Step S208; NO), the processing proceeds to Step S211 which will be described later.

In contrast, when it is determined that there is an entry whose path usage aging timer is set at "0" (Step S208; YES), the link management unit 32 further determines whether or not an evaluation value of the GW to be processed is smaller than an evaluation value of the entry whose path usage aging timer is set at "0" (Step S209). That is, the link management unit 32 determines whether or not the GW to be processed is an unregistered GW with higher path quality.

When it is determined by the link management unit 32 that the evaluation value of the GW to be processed is equal to or greater than the evaluation value of the entry whose path usage aging timer is set at "0" (Step S209; NO), the processing proceeds to Step S211 which will be described later. In contrast, when it is determined that the evaluation value of the GW to be processed is smaller than the evaluation value of the entry whose path usage aging timer is set at "0" (Step S209; YES), the link management unit 32 performs replacement registration of the GW to be processed (Step S210). When there are a plurality of entries which may be replaced at this time, the replacement is performed in descending order of evaluation values thereof, for example.

Then, the link management unit 32 determines whether or not all the GW information included in the received hello frame has been processed (Step S211). When it is determined by the link management unit 32 that there is still unprocessed GW information (Step S211; NO), the processing returns to Step S203, and the aforementioned processing is repeated until the processing on all the GW information included in the received hello frame is completed.

In contrast, when it is determined that all the GW information has been processed (Step S211; YES), the link management unit 32 further determines whether or not a transmission source address of the received hello frame is the LD1 of the main GW of the node device 1 (Step S212). When it is determined by the link management unit 32 that the transmission source address is different from the LD1 of the main GW of the node device 1 (Step S212; NO), the processing is completed without changing the main GW.

In contrast, when it is determined that the transmission source address coincides with the LD1 of the main GW of the node device 1 (Step S212; YES), the link management unit 32 further determines whether or not the evaluation value of the main GW of the node device 1 is the largest among the GWs specified by the GW addresses included in the hello frame except for the main GW for the adjacent node device 1 as the transmission source node device of the hello frame (Step S213).

When it is determined by the link management unit 32 that the evaluation value of the main GW of the node device 1 is not the largest (Step S213; NO), the processing is completed without changing the main GW. In contrast, when it is determined that the evaluation value of the main GW of the node device 1 is the largest (Step S213; YES), the link management unit 32 changes the main GW of the node device 1 (Step S214). In this case, when there are a plurality of GWs whose addresses are included in the received hello frame among the GWs registered in the GW routing table T1 except for the main GW, the link management unit 32 sets a GW with the smallest evaluation value, namely a GW with the highest path quality, as a main GW. Then, the processing is completed.

Figure 10:
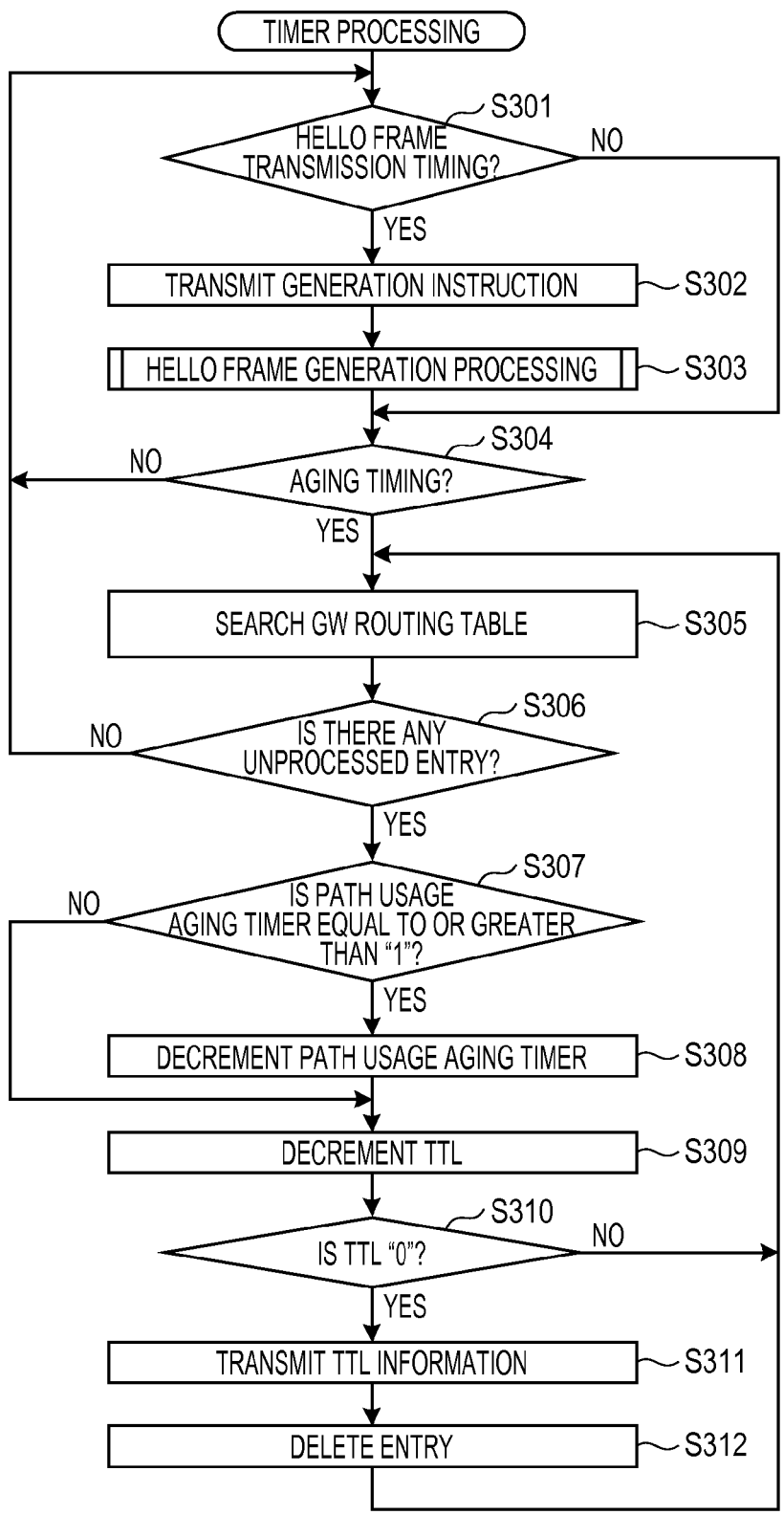
FIG. 10 is a diagram illustrating an example of an operational flowchart for timer processing, according to an embodiment.

Next, a description will be given of a flow of timer processing according to the embodiment with reference to FIG. 10. FIG. 10 is a diagram illustrating an example of an operational flowchart for timer processing, according to an embodiment.

The timer processing unit 34 determines whether or not a timing for transmitting a hello frame has arrived (Step S301). When it is determined by the timer processing unit 34 that the timing for transmitting a hello frame has not arrived yet (Step S301; NO), the processing proceeds to Step S304 which will be described later.

In contrast, when it is determined that the timing for transmitting a hello frame has arrived (Step S301; YES), the timer processing unit 34 transmits an instruction for generating a hello frame to the hello frame generation unit 35 (Step S302), and the hello frame generation unit 35 performs the hello frame generation processing (Step S303).

Then, the timer processing unit 34 determines whether or not an aging timing of the GW routing table T1 has arrived (Step S304). When it is determined by the timer processing unit 34 that the aging timing has not arrived yet (Step S304; NO), the processing returns to Step S301, and the aforementioned processing is repeated.

In contrast, when it is determined that the aging timing has arrived (Step S304; YES), the timer processing unit 34 searches the GW routing table T1 (Step S305) and determines whether or not there is an unprocessed entry in the GW routing table T1 (Step S306).

When it is determined by the timer processing unit 34 that there is no unprocessed entry (Step S306; NO), the processing returns to Step S301, and the aforementioned processing is repeated. In contrast, when it is determined that there is an unprocessed entry (Step S306; YES), the timer processing unit 34 further determines whether or not a value of the path usage aging timer of the entry to be processed is equal to or greater than "1" (Step S307).

When it is determined that the value of the path usage aging timer is equal to or greater than "1" (Step S307; YES), the timer processing unit 34 decrements the path usage aging timer (Step S308). In contrast, when it is determined by the timer processing unit 34 that the value of the path usage aging timer is "0" (Step S307; NO), the processing in Step S308 is skipped, and the processing proceeds to Step S309.

The timer processing unit 34 decrements the TTL in the entry to be processed (Step S309), and determines whether or not the TTL after the decrementing is "0" (Step S310). when it is determined by the timer processing unit 34 that the TTL after the decrementing is not "0" (Step S310; NO), the processing returns to Step S305, and the aforementioned processing is repeated.

In contrast, when it is determined that the TTL after the decrementing is "0" (Step S310; YES), the timer processing unit 34 transmits TTL information indicating that the TTL is "0" to the link management unit 32 (Step S311).

Then, the link management unit 32 deletes the entry corresponding to the GD included in the TTL information from the GW routing table T1 (Step S312). Then, the processing returns to Step S305, and the aforementioned processing is repeated.

Figure 11:
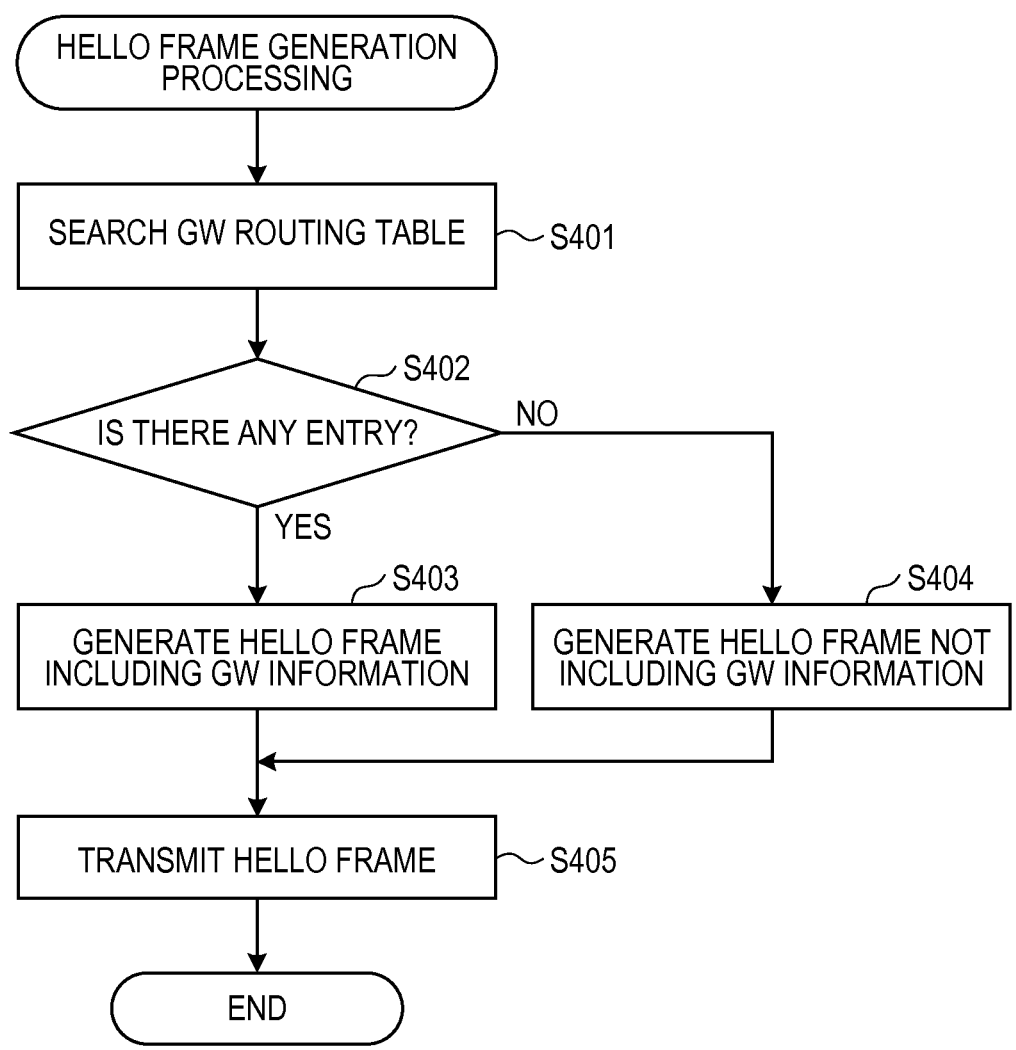
FIG. 11 is a diagram illustrating an example of an operational flowchart for hello frame generation processing, according to an embodiment.

Next, a description will be given of a flow of the hello frame generation processing according to the embodiment with reference to FIG. 11. FIG. 11 is a diagram illustrating an example of an operational flowchart for hello frame generation processing, according to an embodiment. The hello frame generation processing corresponds to Step S303 in the aforementioned timer processing.

The hello frame generation unit 35 search the GW routing table T1 (Step S401) and determines whether or not there are any entries (Step S402).

When it is determined that there are any entries (Step S402; YES), the hello frame generation unit 35 generates a hello frame including GW information of the entries (Step S403). At this time, the hello frame generation unit 35 places a piece of GW information of the main GW at a head and arranges pieces of GW information of the other GWs in ascending order of evaluation values for the GWs (that is, in the order in which a path quality is higher).

In contrast, when it is determined that there is no entry (Step S402; NO), that is, when no GW has been registered in the GW routing table T1, the hello frame generation unit 35 generates a hello frame which does not include any GW information (Step S404). Then, the hello frame generation unit 35 transmits the generated hello frame to the adjacent node device 1 via the communication unit 10 (Step S405).

Next, a description will be given of the processing according to the embodiment based on a specific example with reference to FIGS. 1, 8, 9, and 12 to 25. FIG. 12 is a diagram illustrating an example of the GW routing table T1 provided in the node devices 1 (node devices N1 to N5) which configure the network 100 exemplified in FIG. 1. FIG. 13 is a diagram illustrating an example of the GW routing table T1 provided in the node devices 1 (node devices N6 to N9) which configure the network 100 exemplified in FIG. 1.

In the specific example, it is assumed that the evaluation values are not changed in response to reception of a hello frame. In addition, it is assumed that the GW routing tables T1 for the node devices N1 to N9 illustrated in FIGS. 12 and 13 are in initial states of the specific example. In the specific example, it is assumed that the node device N9 functions as a relay node which is a path to a plurality of GWs as illustrated in FIG. 1.

Figures 14, 15:
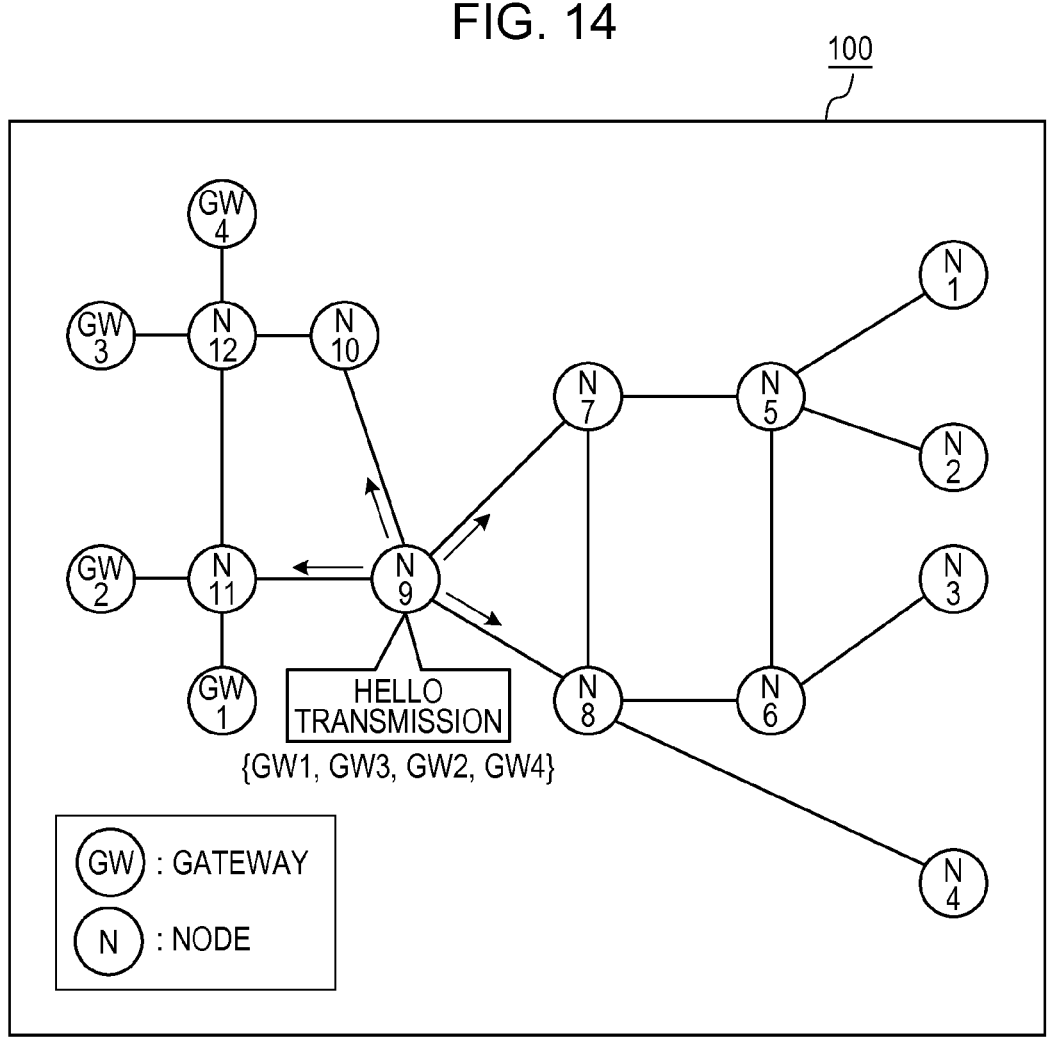
FIG. 14 is a diagram illustrating an example of a state where a node device transmits a hello frame in a network, according to an embodiment.
FIG. 15 is a diagram illustrating an example of a GW routing table of a node device after receiving a hello frame, according to an embodiment.

First, the node device N9 transmits a hello frame to adjacent node devices 1 (the node devices N7, N8, N10, and N11) as illustrated in FIG. 14. Referring to the GW routing table T1 for the node device N9 illustrated in FIG. 13, the GW1 is a main GW, and evaluation values of the other GWs satisfy GW3<GW2<GW4. For this reason, GW information is arranged in the order of {GW1, GW3, GW2, GW4} as illustrated in FIG. 14 in the hello frame transmitted from the node device N9. In addition, FIG. 14 is a diagram illustrating a state where the node device N9 which configures the network 100 exemplified in FIG. 1 transmits the hello frame.

Referring to FIGS. 1 and 9, the node device N9 as the transmission source node device of the hello frame is not the LD1 of the main GW of the node device 1 (Step S212; NO) in this case, the node device N10 and the node device N11 do not change the main GW.

Referring to FIGS. 9 and 13, the LD1 of the GW4 as a main GW of the node device N7 is the node device N9 (Step S212; YES), and the evaluation value of the GW4 is the largest since the GW information of the GW4 is arranged last in the received hello frame (Step S213; YES). Accordingly, the link management unit 32 in the node device N7 changes the main GW as illustrated in FIG. 15. Since the evaluation value of the GW1 is the smallest among the GW1 to the GW4 in the embodiment, the GW1 is set as a main GW. In addition, FIG. 15 is a diagram illustrating an example of the GW routing table T1 for the node device N7 after receiving the hello frame exemplified in FIG. 14.

Referring to FIGS. 9 and 13, since the GW information of the GW2 is not arranged last in the received hallo frame (Step S213; NO) although the LD1 of the GW2 as the main GW of the node device N8 is the node device N9 (Step S212; YES), the main GW is not changed.

Figure 16:
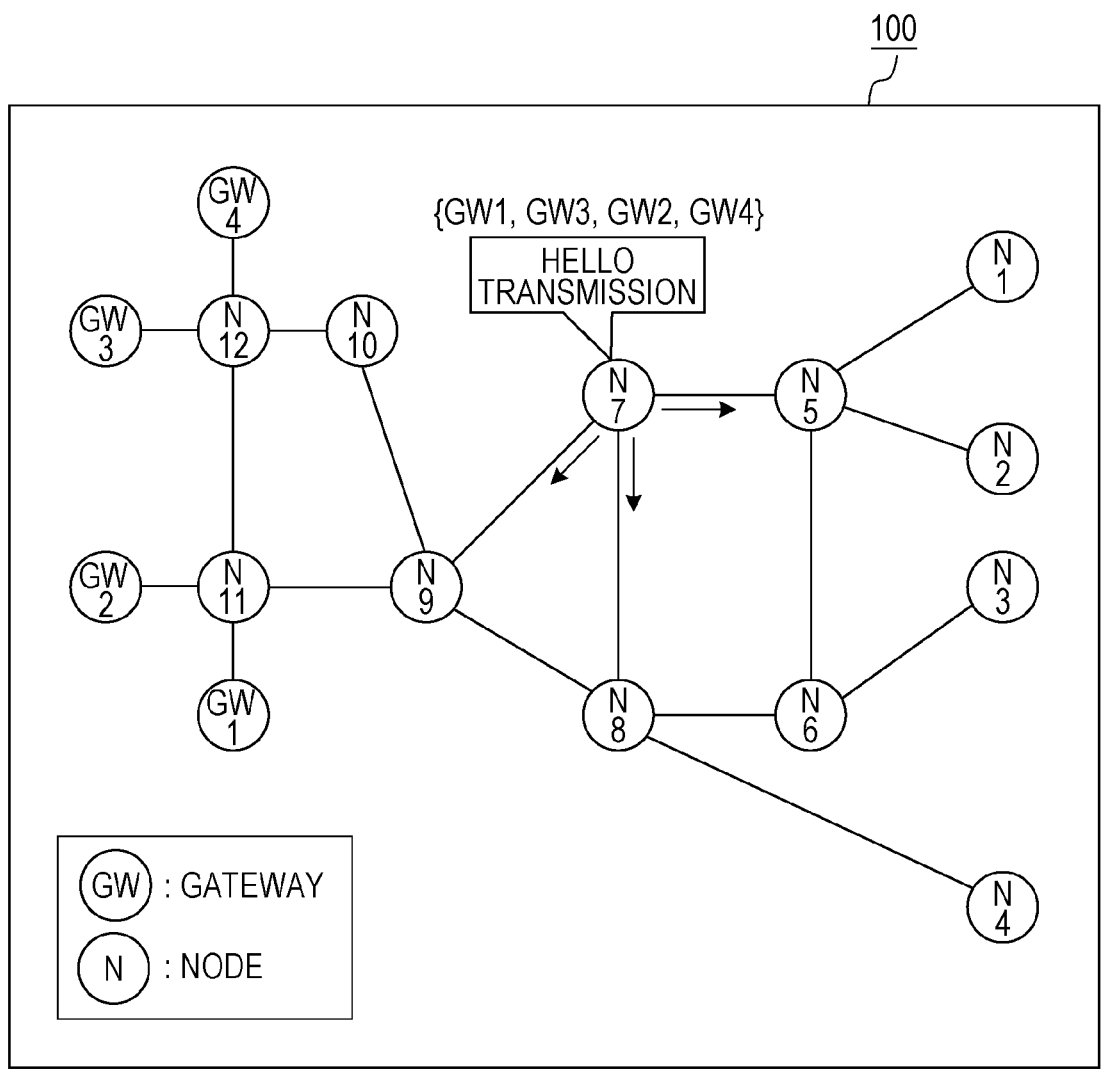
FIG. 16 is a diagram illustrating an example of a state where a node device transmits a hello frame in a network, according to an embodiment.

Next, the node device N7 transmits the hello frame to adjacent node devices 1 (the node devices N5, N8, and N9) as illustrated in FIG. 16. Referring to the GW routing table T1 for the node device N7 illustrated in FIG. 15, the GW1 is the main GW, and evaluation values of the other GWs satisfy GW3<GW2<GW4. For this reason, the GW information is arranged in the order of {GW1, GW3, GW2, GW4} as illustrated in FIG. 16 in the hello frame transmitted from the node device N7. In addition, FIG. 16 is a diagram illustrating a state where the node device N7 which configures the network 100 exemplified in FIG. 1 transmits the hello frame.

In this case, for the node device N5 with reference to FIGS. 9 and 12, since the GW information of the GW3 is not arranged last in the received hello frame (Step S213; NO) although the LD1 of the GW3 as the main GW is the node device N7 (Step S212; YES), the main GW of the node device N5 is not changed.

Referring to FIGS. 9 and 13, for the node device N8, since the LD1 of the GW2 as the main GW is the node device N9 (Step S212; NO), the main GW of the node device N8 is not changed. Similarly, for the node device N9, since the LD1 of the GW1 as the main GW is the node device N11 (Step S212; NO), the main GW of the node device N9 is not changed.

Figures 17, 18:
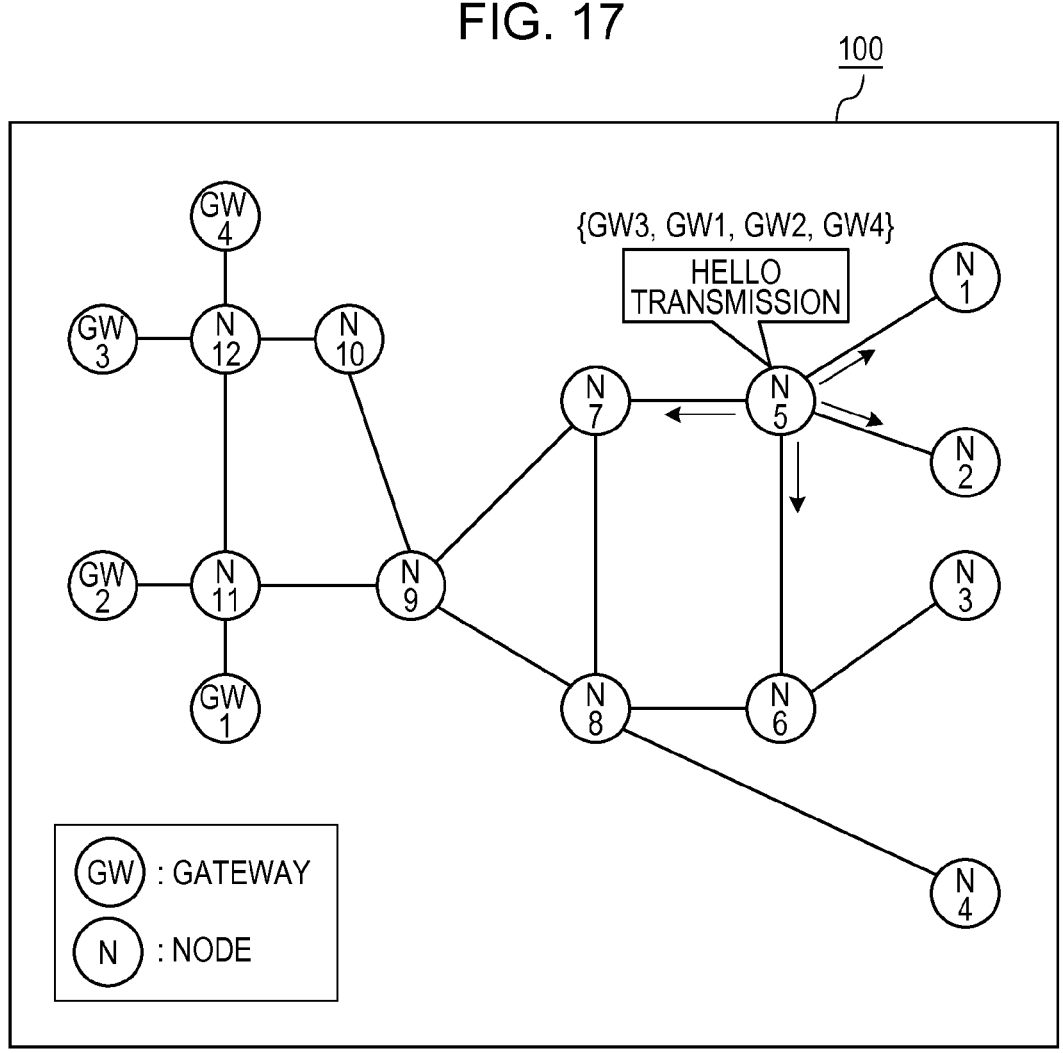
FIG. 17 is a diagram illustrating an example of a state where a node device transmits a hello frame in a network, according to an embodiment.
FIG. 18 is a diagram illustrating an example of a GW routing table of a node device after receiving a hello frame, according to an embodiment.

Next, the node device N5 transmits a hello frame to adjacent node devices (the node devices N1, N2, N6, and N7) 1 as illustrated in FIG. 17. Referring to the GW routing table T1 for the node device N5 illustrated in FIG. 12, the GW3 is the main GW, and evaluation values of the other GWs satisfy GW1<GW2<GW4. Therefore, the GW information is arranged in an order of {GW3, GW1, GW2, GW4} as illustrated in FIG. 17 in the hello frame transmitted from the node device N5. In addition, FIG. 17 is a diagram illustrating a state where the node device N5 which configures the network 100 exemplified in FIG. 1 transmits the hello frame.

In this case, referring to FIGS. 9 and 15, for the node device N7, the main GW of the node device N7 is not changed since the LD1 of the GW1 as the main GW of the node device N7 is the node device N9 (Step S212; NO). In the same manner, for the node device N6, referring to FIGS. 9 and 13, the main GW is not changed since the LD1 of the GW2 as the main GW of the node device N6 is the node device N8 (Step S212; NO).

Referring to FIGS. 9 and 12, for the node device N2, although the LD1 of the GW3 as the main GW of the node device N2 is the node device N5 (Step S212; YES), the main GW is not changed since the GW3 as the main GW of the node device N2 is the main GW of the node device N5 as the transmission source node device of the hello frame (Step S213; NO).

Referring to FIGS. 9 and 12, for the node device N1, the LD1 of the GW4 as the main GW of the node device N1 is the node device N5 (Step S212; YES), and the evaluation value of the GW4 is the largest (Step S213; YES) since the GW information of the GW4 is arranged last in the hello frame. Accordingly, the link management unit 32 of the node device N1 changes the main GW as illustrated in FIG. 18. Since the evaluation value of the GW1 is the smallest among the GW1 to the GW4 in the embodiment, the GW1 is set as the main GW. In addition, FIG. 18 is a diagram illustrating an example of the GW routing table T1 for the node device N1 after receiving the hello frame exemplified in FIG. 17.

Figure 19:
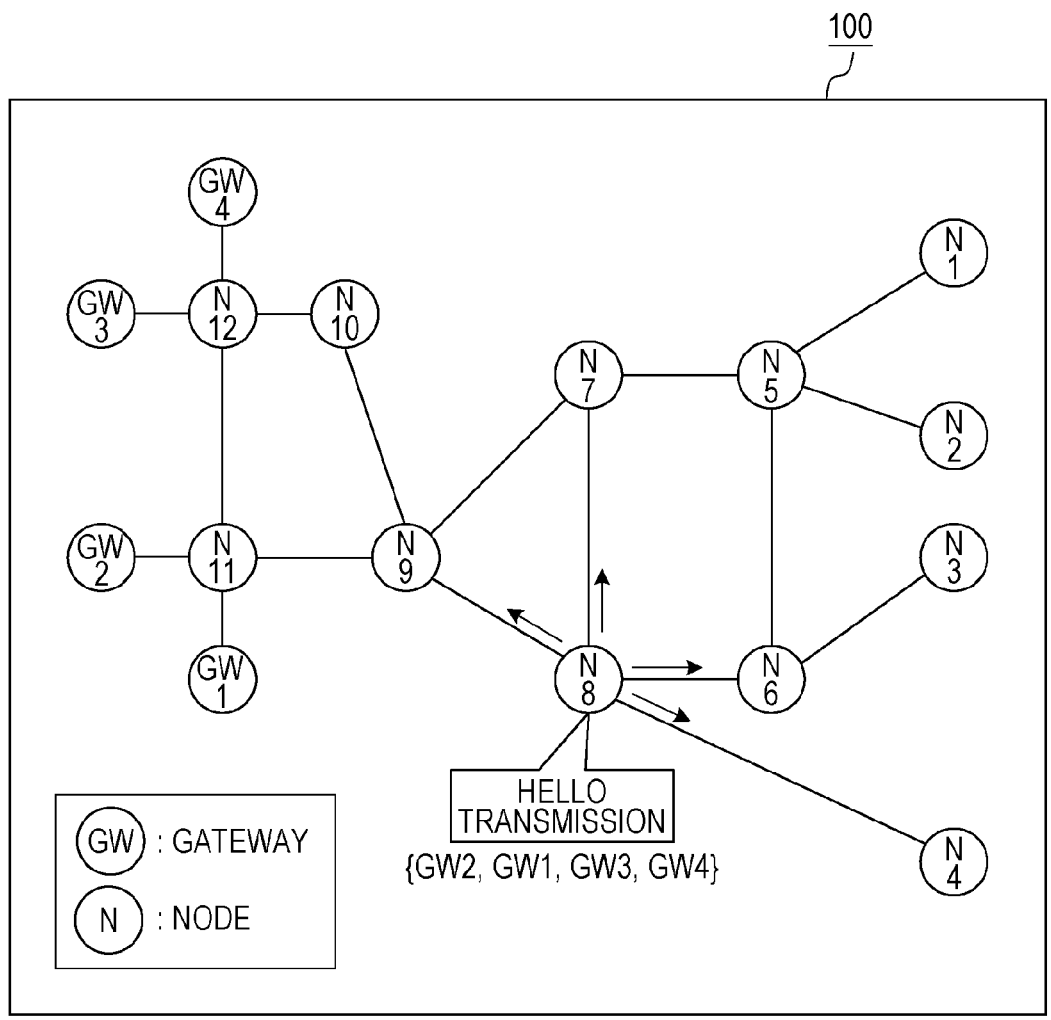
FIG. 19 is a diagram illustrating an example of a state where a node device transmits a hello frame in a network, according to an embodiment.

Next, the node device N8 transmits a hello frame to adjacent node devices 1 (the node devices N4, N6, N7, and N9) as illustrated in FIG. 19. Referring to the GW routing table T1 for the node device N8 illustrated in FIG. 13, the GW2 is the main GW, and evaluation values of the other GWs satisfy GW1<GW3<GW4. Accordingly, the GW information is arranged in the order of {GW2, GW1, GW3, GW4} as illustrated in FIG. 19 in the hello frame transmitted from the node device N8. FIG. 19 is a diagram illustrating a state where the node device N8 which configures the network 100 exemplified in FIG. 1 transmits the hello frame.

In this case, referring to FIGS. 9 and 13, for the node device N9, the main GW is not changed since the LD1 of the GW1 as the main GW of the node device N9 is the node device N11 (Step S212; NO). In the same manner, for the node device N7, referring to FIGS. 9 and 15, the main GW is not changed since the LD1 of the GW1 as the main GW of the node device N7 is the node device N9 (Step S212; NO).

Referring to FIGS. 9 and 13, for the node device N6, although the LD1 of the GW2 as the main GW of the node device N6 is the node device N8 (Step S212; YES), the main GW is not changed since the GW2 as the main GW of the node device N6 is the main GW of the node device N8 as the transmission source node device of the hello frame (Step S213; NO).

Referring to FIGS. 9 and 12, for the node device N4, although the LD1 of the GW1 as the main GW of the node device N4 is the node device N8 (Step S212; YES), the main GW is not changed since the GW information of the GW1 is not arranged last in the hello frame (Step S213; NO).

Figure 20:
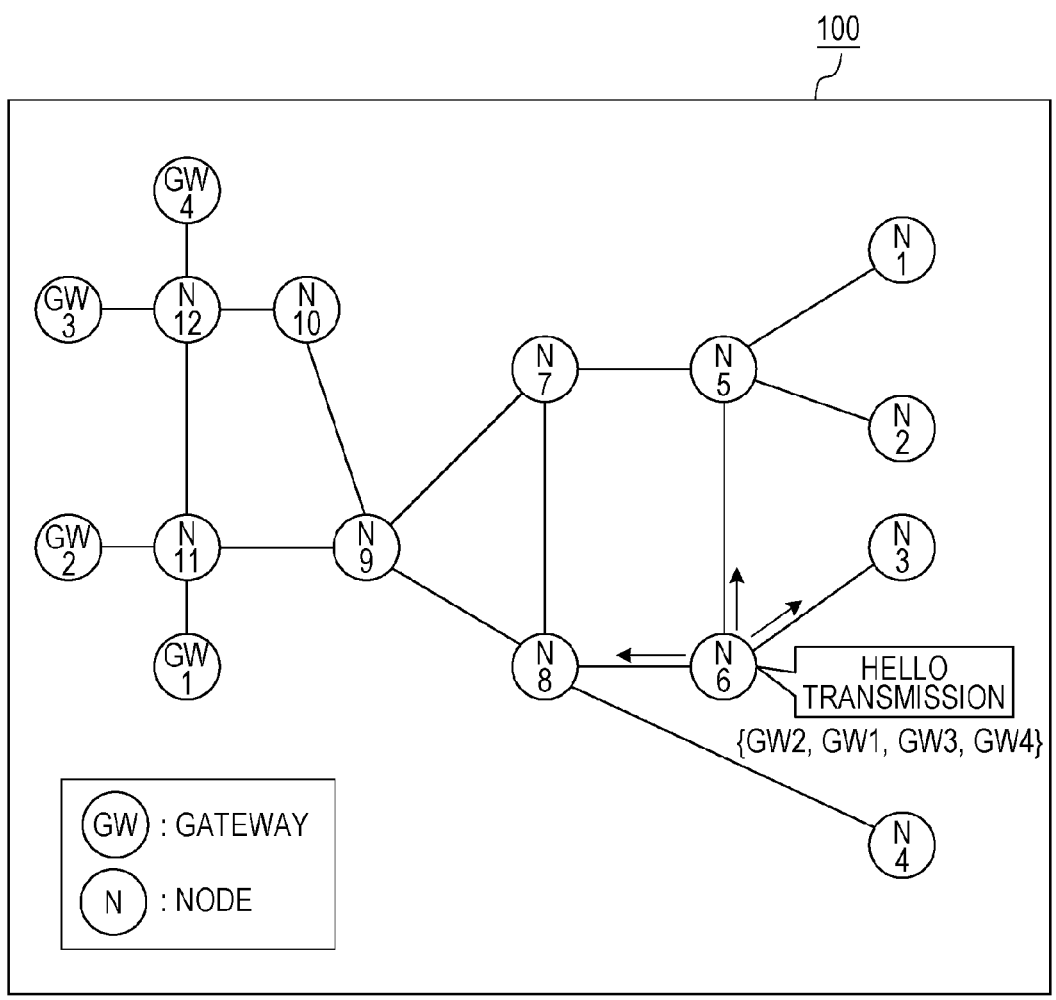
FIG. 20 is a diagram illustrating an example of a state where a node device transmits a hello frame in a network, according to an embodiment.

Next, the node device N6 transmits a hello frame to adjacent node devices 1 (the node devices N3, N5, and N8) as illustrated in FIG. 20. Referring to the GW routing table T1 for the node device N6 illustrated in FIG. 13, the GW2 is the main GW, and evaluation values of the other GWs satisfy GW1<GW3<GW4. Accordingly, the GW information is arranged in the order of {GW2, GW1, GW3, GW4} as illustrated in FIG. 20 in the hello frame transmitted from the node device N6. FIG. 20 is a diagram illustrating a state where the node device N6 which configures the network 100 exemplified in FIG. 1 transmits the hello frame.

In this case, referring to FIGS. 9 and 13, for the node device N8, the main GW is not changed since the LD1 of the GW2 as the main GW of the node device N8 is the node device N9 (Step S212; NO). In the same manner, for the node device N5, referring to FIGS. 9 and 12, the main GW is not changed since the LD1 of the GW3 as the main GW of the node device N5 is the node device N7 (Step S212; NO).

Referring to FIGS. 9 and 12, for the node device N3, although the LD1 of the GW2 as the main GW of the node device N3 is the node device N6 (Step S212; YES), the main GW is not changed since the GW2 as the main GW of the node device N3 is the main GW of the node device N6 as the transmission source node device of the hello frame (Step S213; NO).

Here, FIGS. 21 and 22 illustrate states of the GW routing tables T1 for the node devices N1 to N9 at this timing in the specific example. As illustrated in FIGS. 21 and 22, the node device 1 which uses as the main GW the GW4 with the largest evaluation value, namely the GW4 with the lowest path quality among the GWs registered in the GW routing table T1 for the node device N9 is not present.

Figures 23, 24:
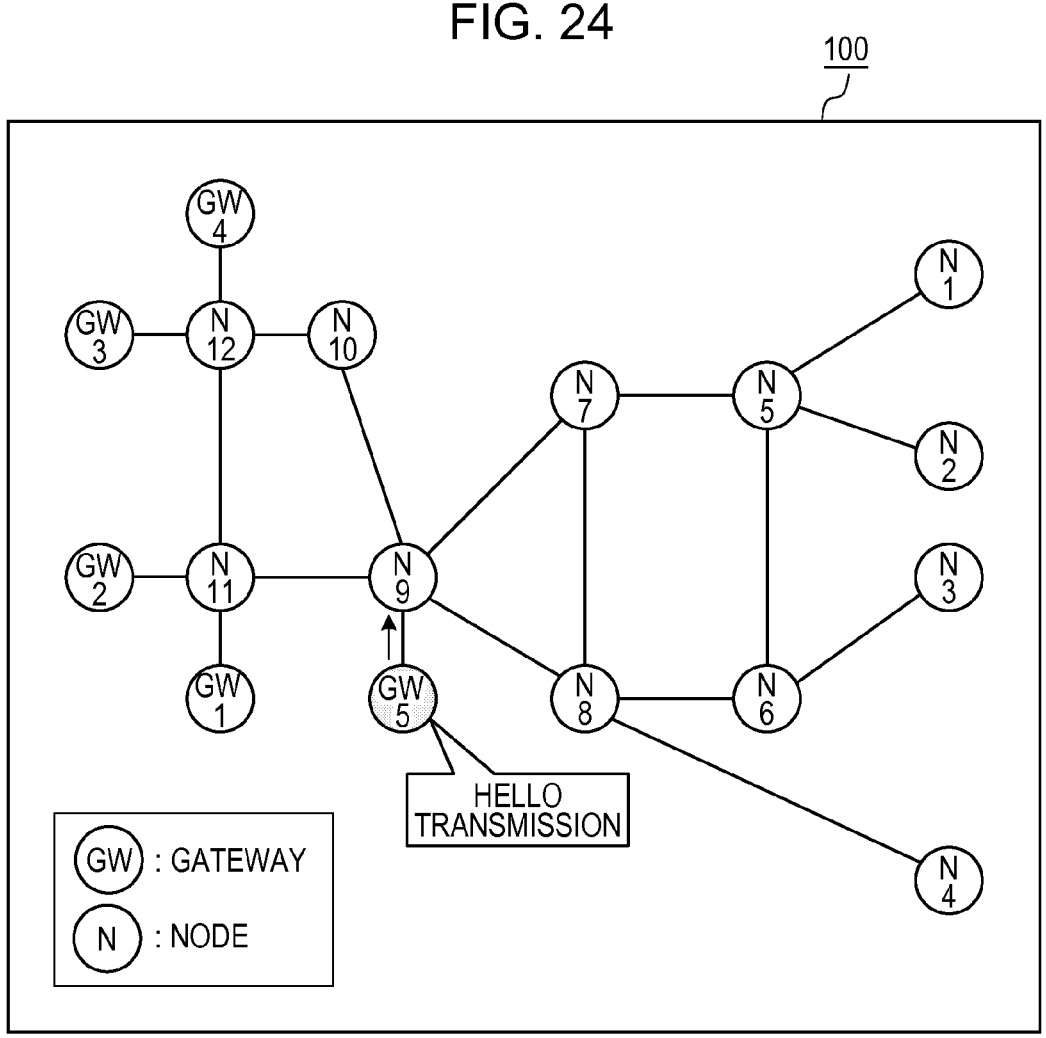
FIG. 23 is a diagram illustrating an example of a GW routing table of a node device in a state where a path usage aging timer becomes zero, according to an embodiment.
FIG. 24 is a diagram illustrating an example of a state where a gateway device is added to a network and transmits a hello frame, according to an embodiment.

Accordingly, since there is no transmission of a data frame from node device 1 on the downstream side of the node device N9 (subordinate node device 1 of the node device N9) to the GW4, the value of the path usage aging timer corresponding to the GW4 becomes "0" in the GW routing table T1 for the node device N9 as illustrated in FIG. 23 after an amount time has elapsed. FIG. 23 is a diagram illustrating a state where the path usage aging timer in the GW routing table T1 for the node device N9 has become "0".

Figures 25, 26:
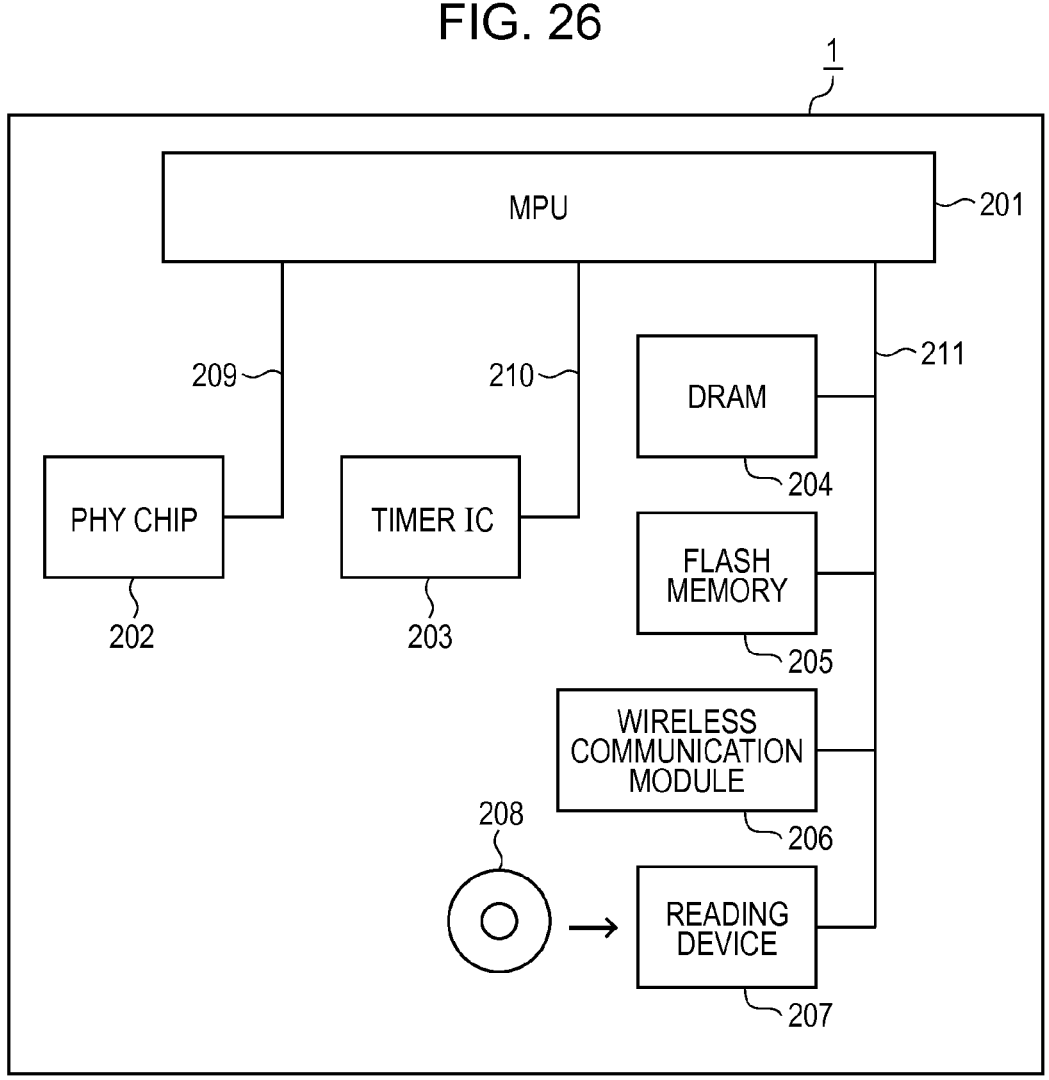
FIG. 25 is a diagram illustrating an example of a GW routing table of a node device after receiving a hello frame, according to an embodiment.
FIG. 26 is a diagram illustrating an example of a hardware configuration of a node device, according to an embodiment.

In this state, when the GW5 is added to the network 100 as illustrated in FIG. 24, a hello frame is transmitted to the node device N9. In the case, when it is assumed that the evaluation value of the GW5 is smaller than the evaluation value of the GW4 (Step S209 in FIG. 8; YES), that is, when it is assumed that the path quality of the GW5 is higher than that of the GW4, the link management unit 32 in the node device N9 performs processing of replacing the GW4 with the GW5 as illustrated in FIG. 25 (Step S210 in FIG. 8). FIG. 24 is a diagram illustrating a state where the GW5 is added to the network 100 exemplified in FIG. 1 and the GW5 transmits a hello frame, and FIG. 25 is a diagram illustrating an example of the GW routing table T1 for the node device N9 after receiving the hello frame exemplified in FIG. 24.

According to the embodiment, the node device 1 maintains the GW routing table T1, in which the LD1, the evaluation value, and the main GW flag are associated with each of the GWs. The node device 1, with reference to the GW routing table T1 at a predetermined timing, generates a hello frame with which the main GW of the node device 1 is able to be specified, and transmits the generated hello frame to a plurality of adjacent node devices 1, where the hello frame includes the same number of pieces of GW information as the number of entries registered in the GW routing table T1 and a node address of itself (the address of the node device 1), each piece of the GW information storing a GW address and an evaluation value of the registered GW. When a transmission source node device of a hello frame received from one of the plurality of adjacent node devices 1 is the LD1 of the main GW of the node device 1 and the evaluation value of the main GW of the node device 1 is the largest among the evaluation values included in the received hello frame except for the evaluation value of the main GW of the transmission source node device, the node device 1 changes the main GW of the node device 1 to a GW which is specified by a GW address included in the received hello frame and one of the GWs registered in the GW routing table T1 except for the main GW.

With such a configuration, it is possible to avoid a state where a second node device 1 (subordinate node device 1) on the downstream side of a first node device 1 (the node device 1) selects a GW with degraded path quality, which is registered in the GW routing table T1, as a main GW. For this reason, the GW with the degraded path quality is not used, and therefore, it is possible to shift the GW routing table T1 to a state where the GW may be replaced with another GW.

Accordingly, when a GW with higher path quality is added to the network 100, it is possible to register the added GW with higher path quality in the GW routing table T1.

FIG. 26 is a diagram illustrating an example of a hardware configuration of a node device, according to an embodiment. The node device 1 illustrated in FIG. 2 may be implemented by various kinds of hardware illustrated in FIG. 26, for example. In the example of FIG. 26, the node device 1 is provided with an MPU 201, a physical layer (PHY) chip 202, and a timer integrated circuit (IC) 203. In addition, the node device 1 is provided with a dynamic random access memory (DRAM) 204, a flash memory 205, a wireless communication module 206, and a reading device 207.

A communication interface which connects the MPU 201 to the PHY chip 202 is a media independent interface or management data input/output (MII/MDIO) 209. Both the MII and the MDIO are interfaces between a physical layer and a media access control (MAC) sublayer. In addition, the MPU 201 and the timer IC 203 are connected via an inter-integrated circuit or parallel input/output ($I^2C$/PIO) bus 210. Moreover, the DRAM 204, the flash memory 205, the wireless communication module 206, and the reading device 207 are connected to the MPU 201 via a peripheral component interconnect (PCI) bus 211.

The MPU 201 loads an operation program, which is stored on the flash memory 205 as a kind of a non-volatile storage device, on the DRAM 204 and executes various kinds of processing by using the DRAM 204 as a working memory. The MPU 201 may implement various functional components in the control unit 30 as illustrated in FIG. 2 by executing the operation program.

In addition, a configuration is also applicable in which the aforementioned processing is executed by storing the operation program for executing the above operations on a computer readable recording medium 208 such as a flexible disk, a compact disc-read only memory (CD-ROM), a digital versatile disc (DVD), or a magnet optical disc (MO), distributing the operation program, and causing the reading device 207 in the node device 1 to read the operation program to install the operation program on a computer. Furthermore, the operation program may be stored on a disc device or the like provided in a server device on the Internet and may be downloaded by the computer in the node device 1 via the PHY chip 202 or the wireless communication module 206.

In addition, storage devices other than the DRAM 204 and the flash memory 205 may be used in accordance with an embodiment. For example, the node device 1 may be provided with a storage device such as a content addressable memory (CAM), a static random access memory (SRAM), and a synchronous dynamic random access memory (SDRAM).

The GW routing table T1 illustrated in FIG. 2 and the like is implemented by the DRAM 204, the flash memory 205, or another storage device which is not illustrated. In addition, the flash memory 205 stores the address of the node device 1 and the like as well as the operation program.

The PHY chip 202 is a circuit which performs processing of the physical layer in a wired connection. In a case where the network 100 is a wireless network, the node device 1 may not be provided with the PHY chip 202. However, the node device 1 may be provided with the PHY chip 202 for the connection between the node device 1 and an external network.

For example, the node device 1 may be provided with a wired LAN port based on the Ethernet (registered trademark) and may be connected to a gateway device in an external network via a cable which is connected to the wired LAN port.

In such a case, the MPU 201 may generate an Ethernet frame and output the Ethernet frame to the PHY chip 202 via the MII/MDIO 209. Then, the PHY chip 202 converts the output from the MPU 201 (that is a logical signal indicating the Ethernet frame) into a signal in accordance with a type of the cable (that is, into an electrical signal or an optical signal) and outputs the converted signal to the cable. As described above, the node device 1 may transmit data (a frame, for example) to the external network by using the PHY chip 202.

In addition, the PHY chip 202 may convert an electrical signal or an optical signal, which is output from the external network via the cable and the wired LAN port, into a logical signal and output the logical signal to the MPU 201 via the MII/MDIO 209. As described above, the node device 1 may receive data (a frame, for example) from the external network by using the PHY chip 202.

The timer IC 203 is a circuit which performs a count-up operation until a set amount of time has elapsed, and if the set amount of time has elapsed, outputs an interruption signal.

The wireless communication module 206 is hardware which performs processing of the physical layer in wireless communication. The wireless communication module 206 is provided with an antenna, an analog-to-digital converter (ADC), a digital-to-analog converter (DAC), a modulator, a demodulator, an encoder, a decoder, and the like.

In addition, the hardware configuration of the node device 1 may differ from that in FIG. 26 in accordance with an embodiment, and it is also possible to apply hardware other than the standard and the type exemplified in FIG. 26 to the node device 1.

For example, the respective functional components in the control unit 30 illustrated in FIG. 2 may be implemented by a hardware circuit. Specifically, the respective functional components in the control unit 30 illustrated in FIG. 2 may be implemented by a reconfigurable circuit, such as a field programmable gate array (FPGA), an application specific integrated circuit (ASIC), or the like instead of the MPU 201. It is a matter of course that these functional components may be implemented by both the MPU 201 and the hardware circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node device included in a communication network, the node device comprising:
a processor; and
a memory coupled to the processor, the memory being configured to store a table that manages paths to a plurality of gateway devices for connecting to another communication network, the table including a first number of entries that store first path information, path quality information, and specification information in association with each of the plurality of gateway devices, the first path information identifying a local-destination node device, among a plurality of adjacent node devices having links to the node device, that operates as a first hop destination of a data frame destined for the each gateway device when the data frame is transmitted from the node device, the path quality information indicating quality of a path to the each gateway device, the specification information specifying a first main gateway device operating as a gateway device that is used by the node device when the node device communicates with another node device configuring the another communication network, wherein
the processor is configured:
to generate a first hello frame for specifying the first main gateway device of the node device at a first predetermined timing with reference to the table, the first hello frame including gateway device information and device identification information identifying the node device, the gateway device information including the first number of pairs of gateway device identification information identifying each of the plurality of gateway devices registered in the table and the path quality information associated with the each gateway device,
to transmit the generated first hello frame to the plurality of adjacent node devices,
to receive a second hello frame from any one of the plurality of adjacent node devices,
to determine whether or not a transmission source node device of the second hello frame is the local-destination node device for the first main gateway device of the node device, with reference to the table, based on the device identification information included in the second hello frame,
to, when it is determined that the transmission source node device of the second hello frame is the local-destination node device for the first main gateway device of the node device, determine whether or not quality of a path to the first main gateway device is lowest among paths to the plurality of gateway devices excluding a path to a second main gateway device operating as a main gateway of the transmission source node device of the second hello frame, based on the path quality information included in the second hello frame, and
to, when it is determined that the quality of a path to the first main gateway device is lowest, change the specification information so that one of other gateway devices that are registered in the table and specified by the gateway device identification information included in the second hello frame is set as the first main gateway device of the node device.

2. The node device of claim 1, wherein
each entry of the table further includes frequency information indicating a frequency at which a data frame is transmitted to a first gateway device associated with the each entry; and
the processor is further configured:
to update the frequency information at a second predetermined timing, and
to, in a case where a second gateway device is added to the communication network, register the second gateway device to the table when there is a vacancy for a new entry in the table, or register the second gateway device to the table after deleting a first entry whose frequency information indicates that a data frame destined for the first gateway device has not been transmitted for at least a predetermined period of time when there is no vacancy for a new entry in the table.

3. The node device of claim 2, wherein
the processor registers the second gateway device to the table by deleting the first entry when quality of a path to the second gateway device is higher than that to the first gateway device.

4. The node device of claim 1, wherein
a gateway device, among the other gateway devices, having a path quality that is highest among path qualities contained in the path quality information included in the second hello frame, is determined as the first main gateway device.

5. The node device of claim 1, wherein
the processor determines whether or not the transmission source node device of the second hello frame is the local-destination node device for the first main gateway device, by determining whether or not the transmission source node device of the second hello frame coincides with an adjacent node device identified by the first path information that is associated with the first main gateway device in the table.

6. The node device of claim 1, wherein
the processor generates the first hello frame by which the first main gateway device of the node device is identifiable, by placing, within the gateway device information, a pair of the gateway device identification information and the path quality information associated with the first main gateway device, at a predetermined area different from an area storing pairs of the gateway device identification information and the path quality information associated with gateway devices other than the main gateway device.

7. The node device of claim 1, wherein
each entry of the table further includes validity information indicating validity of the each entry; and
the processor is further configured:
to update the validity information of entries of the table at a second predetermined timing, and
to delete an entry when the validity information of the entry indicates that the entry is invalidated.

8. A method being performed by a node device in a communication network, the method comprising:
referring to a table that manages paths to a plurality of gateway devices for connecting to another communication network, the table including a first number of entries that store first path information, path quality information, and specification information in association with each of the plurality of gateway devices, the first path information identifying a local-destination node device, among a plurality of adjacent node devices each having a link to the node device, that operates as a first hop destination of a data frame destined for the each gateway device when the data frame is transmitted from the node device, the path quality information indicating quality of a path to the each gateway device, the specification information specifying a first main gateway device operating as a gateway device that is used by the node device when the node device communicates with another node device configuring the another communication network;

generating a first hello frame for specifying the first main gateway device of the node device at a predetermined timing with reference to the table, the first hello frame including gateway device information and device identification information identifying the node device, the gateway device information including the first number of pairs of gateway device identification information identifying each of the plurality of gateway devices registered in the table and the path quality information associated with the each gateway device;

transmitting the generated first hello frame to the plurality of adjacent node devices;

receiving a second hello frame from any one of the plurality of adjacent node devices;

determining whether or not a transmission source node device of the second hello frame is the local-destination node device for the first main gateway device of the node device when the data frame is transmitted from the node device, with reference to the table, based on the device identification information included in the second hello frame;

when it is determined that the transmission source node device of the second hello frame is the local-destination node device for the first main gateway device, determining whether or not quality of a path to the first main gateway device is lowest among paths to the plurality of gateway devices excluding a path to a second main gateway device of the transmission source node device of the second hello frame, based on the path quality information included in the second hello frame; and when it is determined that the quality of a path to the first main gateway device is lowest, changing the specification information so that one of other gateway devices that are registered in the table and specified by the gateway device identification information included in the second hello frame is set as the first main gateway device of the node device.

9. A non-transitory, computer-readable recording medium having stored therein a program for causing a computer included in a node device in a communication network to execute a process comprising:

referring to a table that manages paths to a plurality of gateway devices for connecting to another communication network, the table including a first number of entries that store first path information, path quality information, and specification information in association with each of the plurality of gateway devices, the first path information identifying a local-destination node device, among a plurality of adjacent node devices each having a link to the node device, that operates as a first hop destination of a data frame destined for the each gateway device when the data frame is transmitted from the node device, the path quality information indicating quality of a path to the each gateway device, the specification information specifying a first main gateway device operating as a gateway device that is used by the node device when the node device communicates with another node device configuring the another communication network;

generating a first hello frame for specifying the first main gateway device of the node device at a predetermined timing with reference to the table, the first hello frame including gateway device information and device identification information identifying the node device, the gateway device information including the first number of pairs of gateway device identification information identifying each of the plurality of gateway devices registered in the table and the path quality information associated with the each gateway device;

transmitting the generated first hello frame to the plurality of adjacent node devices;

receiving a second hello frame from any one of the plurality of adjacent node devices;

determining whether or not a transmission source node device of the second hello frame is the local-destination node device for the first main gateway device of the node device when the data frame is transmitted from the node device, with reference to the table, based on the device identification information included in the second hello frame;

when it is determined that the transmission source node device of the second hello frame is the local-destination node device for the first main gateway device, determining whether or not quality of a path to the first main gateway device is lowest among paths to the plurality of gateway devices excluding a path to a second main gateway device of the transmission source node device of the second hello frame, based on the path quality information included in the second hello frame; and when it is determined that the quality of a path to the first main gateway device is lowest, changing the specification information so that one of other gateway devices that are registered in the table and specified by the gateway device identification information included in the second hello frame is set as the first main gateway device of the node device.

* * * * *